(12) United States Patent
Sunahara et al.

(10) Patent No.: US 9,742,337 B2
(45) Date of Patent: Aug. 22, 2017

(54) POWER CONVERSION APPARATUS

(71) Applicants: Shohei Sunahara, Toyota (JP); Yasuhito Imai, Toyota (JP); Miyoko Nakano, Susono (JP)

(72) Inventors: Shohei Sunahara, Toyota (JP); Yasuhito Imai, Toyota (JP); Miyoko Nakano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/760,083

(22) PCT Filed: Dec. 24, 2013

(86) PCT No.: PCT/JP2013/084509
§ 371 (c)(1),
(2) Date: Jul. 9, 2015

(87) PCT Pub. No.: WO2014/125741
PCT Pub. Date: Aug. 21, 2014

(65) Prior Publication Data
US 2015/0357959 A1 Dec. 10, 2015

(30) Foreign Application Priority Data
Feb. 18, 2013 (JP) ................................. 2013-029468

(51) Int. Cl.
*H02P 27/06* (2006.01)
*B60L 11/14* (2006.01)
(Continued)

(52) U.S. Cl.
CPC ............... *H02P 27/06* (2013.01); *B60L 7/14* (2013.01); *B60L 11/14* (2013.01); *B60L 15/007* (2013.01);
(Continued)

(58) Field of Classification Search
CPC .......................... B60L 15/2009; B60L 11/14
See application file for complete search history.

(56) References Cited

U.S. PATENT DOCUMENTS

| 2003/0052696 | A1* | 3/2003 | Strayer | G01D 3/036 |
| | | | | 324/546 |
| 2006/0055349 | A1* | 3/2006 | Nakayama | B60L 11/123 |
| | | | | 318/400.18 |

(Continued)

FOREIGN PATENT DOCUMENTS

| CN | 1757155 A | 4/2006 |
| JP | 2006-074932 A | 3/2006 |

(Continued)

*Primary Examiner* — Shawki S Ismail
*Assistant Examiner* — Muhammad S Islam
(74) *Attorney, Agent, or Firm* — Oliff PLC

(57) ABSTRACT

A power conversion apparatus includes a pair of switching elements that are connected in series between a higher potential side terminal and a lower potential side terminal to form upper and lower arms; a coil whose end is connected between the pair of switching elements; and a controller that calculates, based on a voltage between the higher potential side terminal and the lower potential side terminal and an inductance of the coil, a time rate of change of a current value of a current flowing through the coil, and switches, based on the calculated time rate of change of the current value, between a single arm drive mode in which only one of the pair of switching elements is driven to be turned on/off and a double arm drive mode in which the pair of switching elements are driven to be turned on/off in opposite phase.

4 Claims, 25 Drawing Sheets

(51) Int. Cl.
*H02M 7/797* (2006.01)
*B60L 7/14* (2006.01)
*B60L 15/00* (2006.01)
*B60L 15/20* (2006.01)

(52) U.S. Cl.
CPC ......... *B60L 15/2009* (2013.01); *H02M 7/797* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/80* (2013.01); *Y02T 10/645* (2013.01); *Y02T 10/70* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

2010/0103055 A1\* 4/2010 Waku ................. G06K 19/0723
  343/702
2012/0049774 A1\* 3/2012 Takamatsu .......... B60L 11/1803
  318/400.3

FOREIGN PATENT DOCUMENTS

| JP | 2011-120329 A | 6/2011 |
| JP | 2011-200000 A | 10/2011 |
| JP | 2011-223701 A | 11/2011 |
| JP | 2012-139084 A | 7/2012 |
| JP | 2014-143875 A | 8/2014 |

\* cited by examiner

FIG.3
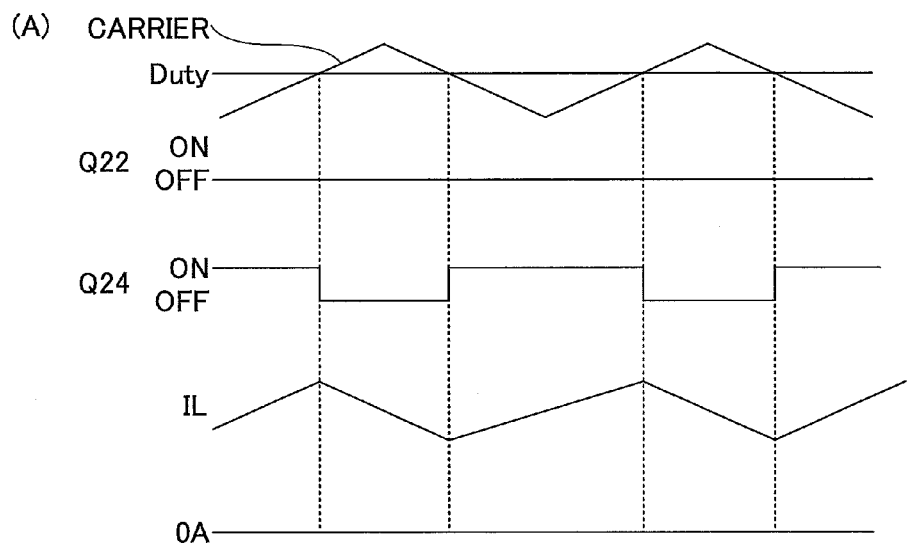
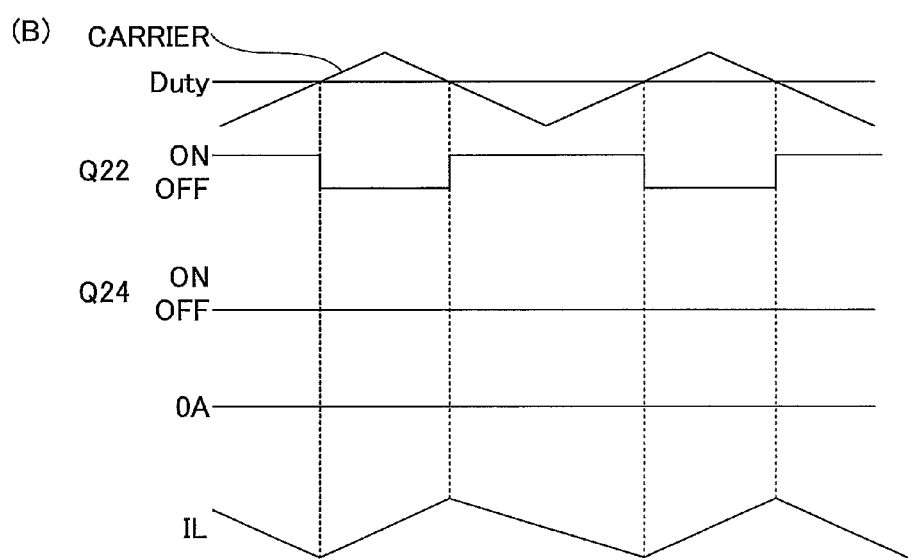

FIG.8
(A)
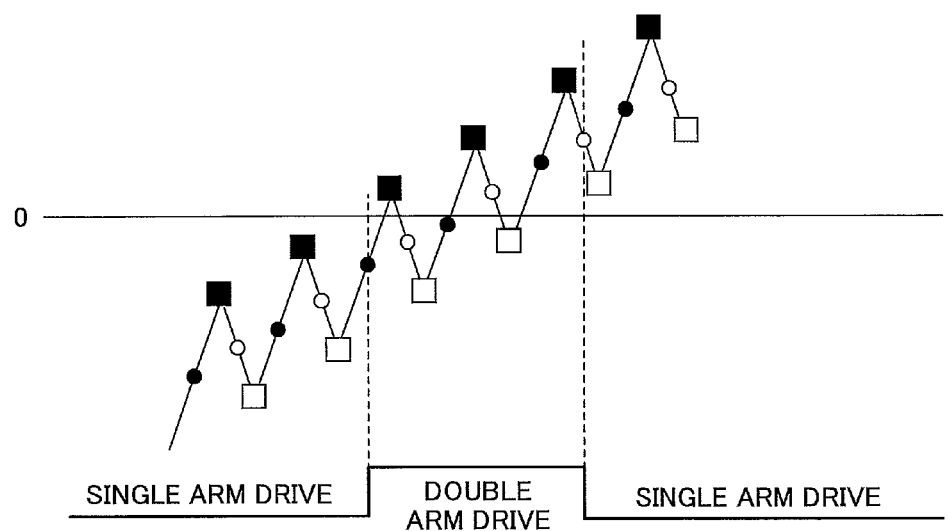
SINGLE ARM DRIVE | DOUBLE ARM DRIVE | SINGLE ARM DRIVE
(B)
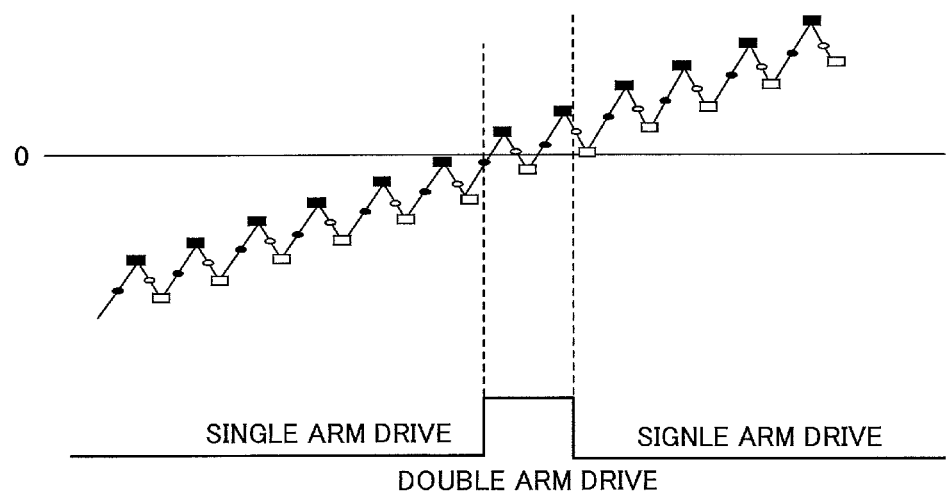
SINGLE ARM DRIVE | DOUBLE ARM DRIVE | SIGNLE ARM DRIVE

POWER CONVERSION APPARATUS

TECHNICAL FIELD

The disclosure is related to a power conversion apparatus.

BACKGROUND ART

A DC-DC converter apparatus is known in which a both sides switching mode (double arm drive mode) is used in a state in which a DC-DC converter is performing a voltage raising operation, a zero A crossing state in which the DC-DC converter does not substantially perform the voltage raising operation or a voltage decreasing operation, and a state in which the DC-DC converter is performing the voltage decreasing operation, while a single side switching mode (single arm drive mode) is used in a state in which a primary current is close to zero A even when the DC-DC converter is performing the voltage raising operation, and a state in which the primary current is close to zero A even when the DC-DC converter is performing the voltage decreasing operation (see Patent Document 1 and 2, for example).

[Patent Document 1] Japanese Laid-open Patent Publication No. 2011-120329

[Patent Document 2] Japanese Laid-open Patent Publication No. 2006-74932

DISCLOSURE OF INVENTION

Problem to be Solved by Invention

As a configuration disclosed in Patent Document 1, at the time of a zero crossing event when a reactor current straddles zero (zero A crossing state), the double arm drive is performed in which switching elements of upper and lower arms are turned on/off in opposite phase. In such a configuration, it is ideal to shorten a double arm drive period as much as possible in order to reduce a gate interference (increased loss generated at the time of turning on the switching element while a diode is conducting) at the time of the double arm drive. It is noted that the reactor current includes a ripple component, and thus it is generally difficult to predict the zero A crossing timing with pinpoint accuracy.

Therefore, it is an object to provide a power conversion apparatus that can make it possible to shorten a double arm drive period.

Means to Solve the Problem

According to an aspect of the disclosure, a power conversion apparatus is provided, which includes a pair of switching elements that are connected in series between a higher potential side terminal and a lower potential side terminal to form upper and lower arms;

a coil whose end is connected between the pair of switching elements; and a controller that calculates, based on a voltage between the higher potential side terminal and the lower potential side terminal and an inductance of the coil, a time rate of change of a current value of a current flowing through the coil, and switches, based on the calculated time rate of change of the current value, between a single arm drive mode in which only one of the pair of switching elements is driven to be turned on/off and a double arm drive mode in which the pair of switching elements are driven to be turned on/off in opposite phase.

Advantage of the Invention

According to the disclosure, a power conversion apparatus can be obtained that can make it possible to shorten a double arm drive period.

BRIEF DESCRIPTION OF DRAWINGS

FIG. 3 is a diagram illustrating an example a time series of ON/OFF states of switching elements Q22 and Q24 that are switched based on a carrier signal and a duty.

FIG. 8 is a diagram illustrating a way of switching between the single arm drive mode and the double arm drive mode according to an embodiment for contrast with FIG. 7.

Figure 1:
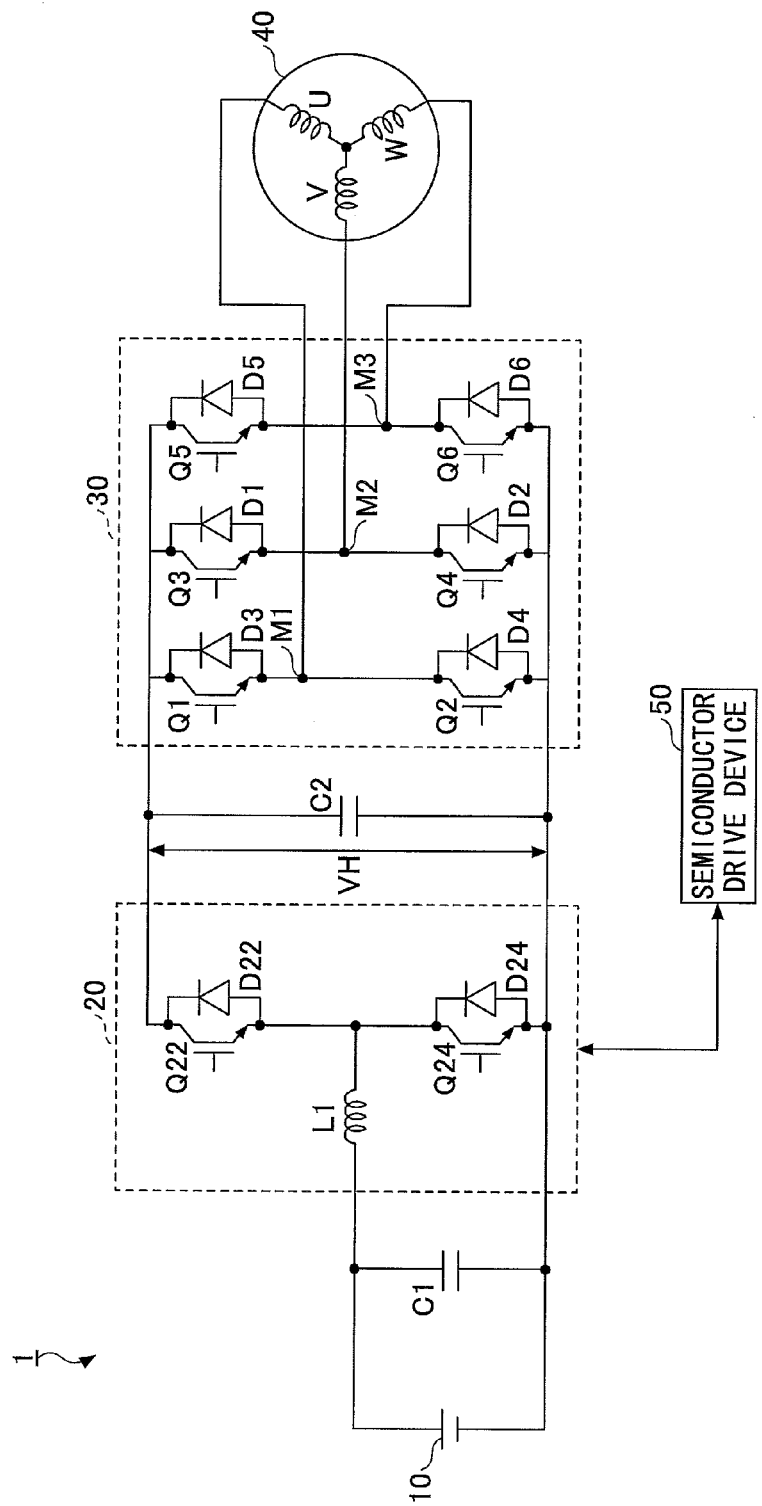
FIG. 1 is a diagram illustrating an example of an overview configuration of a motor drive system 1 for an electric vehicle.

DESCRIPTION OF REFERENCE SYMBOLS 1 motor drive system
10 battery
20 DC-DC converter
30 inverter
40 vehicle travel motor
50 semiconductor driver device
Q1, Q2 switching element related to U-phase
Q3, Q4 switching element related to V-phase
Q5, Q6 switching element related to W-phase
Q22 switching element of upper arm
Q24 switching element of lower arm
500 control block
502 filter
504 ADC
506 current control part
508 voltage control part
510 motor target voltage calculation part
513 carrier generation part
514 gate signal generation circuit part
516 sampling timing calculation part
518 drive mode determination part

BEST MODE FOR CARRYING OUT THE INVENTION

In the following, embodiments are described in detail with reference to appended drawings.

FIG. 1 is a diagram illustrating an example of an overview configuration of a motor drive system 1 for an electric vehicle. The motor drive system 1 is a system for driving a vehicle travel motor 40 for driving a vehicle using power from a battery 10. It is noted that a type of the electric vehicle or a detailed configuration of the electric vehicle may be arbitrary as long as the electric vehicle is driven with the vehicle travel motor 40 using electric power. Typically, the electric vehicle includes a hybrid vehicle (HV) which uses an internal combustion engine and the vehicle travel motor 40 as power sources and a genuine electric vehicle which uses the vehicle travel motor 40 only as a power source.

The motor drive system 1 includes the battery 10, a DC-DC converter 20, an inverter 30, the vehicle travel motor 40 and a semiconductor driver device 50, as shown in FIG. 1.

The battery 10 is an arbitrary capacitor cell which accumulates power to output a direct-current voltage. The battery 10 may be configured as a nickel hydrogen battery, a lithium ion battery or a capacitive element such as an electrical double layer capacitor, etc.

The DC-DC converter 20 may be a bidirectional DC-DC converter (a reversible chopper type DC-DC converter). The DC/DC converter 20 may be capable of performing a step-up conversion of 200 V to 650 V, and a step-down conversion of 650 V to 200 V, for example. A smoothing capacitor C1 may be connected between an input side of an inductor (coil) L1 of the DC-DC converter 20 and a negative electrode line.

In the illustrated example, the DC/DC converter 20 includes two switching elements Q22 and Q24, and the inductor L1. The switching elements Q22 and Q24 are connected in series between a positive side line and a negative side line of the inverter 30. The inductor L1 is connected in series to the positive side of the battery 10. The inductor L1 has an output side connected to a connection point between the switching elements Q22 and Q24.

In the illustrated example, the switching elements Q22 and Q24 of the DC/DC converter 20 are IGBTs (Insulated Gate Bipolar Transistors). It is noted that the switching elements Q22 and Q24 may be ordinary IGBTs which include diodes (freewheel diodes, for example) D22 and D24 that are externally provided, or RC (Reverse Conducting)—IGBTs that internally include the diodes D22 and D24. In any case, a collector of the switching element Q22 of an upper arm is connected to a positive side line of the inverter 30, and an emitter of the switching element Q22 of the upper arm is connected to a collector of the switching element Q24 of a lower arm. Further, the emitter of the switching element Q24 of the lower arm is connected to a negative side line of the inverter 30 and a negative pole of the battery 10. It is noted that the switching elements Q22 and Q24 may be transistors other than IGBTs, such as MOSFETs (metal oxide semiconductor field-effect transistor), etc.

The inverter 30 includes arms of U-V-W phases disposed in parallel between the positive side line and the negative side line. The U-phase arm includes switching elements (IGBT in this example) Q1 and Q2 connected in series, the V-phase arm includes switching elements (IGBT in this example) Q3 and Q4 connected in series and the W-phase arm includes switching elements (IGBT in this example) Q5 and Q6 connected in series. Further, diodes D1-D6 are provided between collectors and emitters of the switching elements Q1-Q6, respectively. It is noted that the switching elements Q1-Q6 may be transistors other than IGBTs, such as MOSFETs, etc.

The vehicle travel motor 40 is a three-phase permanent-magnetic motor and one end of each coil of the U, V and W phases is commonly connected at a midpoint therebetween. The other end of the coil of U-phase is connected to a midpoint M1 between the switching elements Q1 and Q2, the other end of the coil of V-phase is connected to a midpoint M2 between the switching elements Q3 and Q4 and the other end of the coil of W-phase is connected to a midpoint M3 between the switching elements Q5 and Q6. A smoothing capacitor C2 is connected between a collector of the switching element Q1 and the negative electrode line. It is noted that the vehicle travel motor 40 may be a hybrid three-phase motor that includes an electromagnet and a permanent magnet in combination.

It is noted that, in addition to the vehicle travel motor 40, a second motor for driving a vehicle or a generator may be added in parallel with respect to the vehicle travel motor 40. In this case, a corresponding inverter may be added in parallel.

The semiconductor driver device 50 controls the DC-DC converter 20 and the inverter 30. The semiconductor drive device 50 may be an ECU (Electronic Control Unit) that includes a microcomputer. Functions of the semiconductor drive device 50 (including functions described hereinafter)

may be implemented by any hardware, any software, any firmware or any combination thereof. For example, the functions of the semiconductor drive device 50 may be implemented by an ASIC (application-specific integrated circuit) and a FPGA (Field Programmable Gate Array). Further, the functions of the ECU 50 may be implemented by a plurality of ECUs in cooperation.

A general way of controlling the DC/DC converter 20 may be arbitrary. Typically, the semiconductor drive device 50 controls the DC/DC converter 20 according to an operation state (a powering operation or a regenerating operation) of the inverter 30. For example, at the time of the powering operation, the semiconductor drive device 50 performs the ON/OFF switching of only the switching element Q24 of the lower arm (i.e., a single-arm drive by the lower arm) to increase the voltage of the battery 10 and output the increased voltage to the side of the inverter 30. In this case, the switching element Q24 of the lower arm may be controlled with PWM (Pulse Width Modulation). Further, at the time of the regenerating operation, the semiconductor drive device 50 performs the ON/OFF switching of only the switching element Q22 of the upper arm (i.e., a single-arm drive by the upper arm) to decrease the voltage on the side of the inverter 30 and output the decreased voltage to the side of the battery 10. In this case, the switching element Q22 of the upper arm may be controlled with PWM. Further, the semiconductor drive device 50 may perform the ON/OFF switching of the switching elements Q22 and Q24 in a reversed phase (i.e., a double-arm drive) when the current flowing through the inductor L1 crosses 0 (at the time of a zero cross event).

A general way of controlling the inverter 30 may be arbitrary. Typically, the semiconductor driver device 50 drives the switching elements Q1 and Q2 related to the U-phase to be turned on/off, the switching elements Q3 and Q4 related to the V-phase to be turned on/off and the switching elements Q5 and Q6 related to the W-phase to be turned on/off such that phase currents flowing through coils of the corresponding (U, V or W) phases are varied in a sine curve and have a relationship of phases shifted by 120 degrees with respect to each other. In this case, in the respective phases, only the switching elements Q1, Q3 and Q5 may be switched on/off (i.e., the single arm drive with the upper arm) when the phase current is in a positive range, and only the switching elements Q2, Q4 and Q6 may be switched on/off (i.e., the single arm drive with the lower arm) when the phase current is in a negative range. In this case, the switching elements Q1 through Q6 may be PWM-controlled. Further, in the respective phases, when the phase current crosses zero A (at the time of a zero crossing event), the semiconductor driver device 50 may drive the switching elements (Q1, Q2; Q3, Q4; Q5, Q6) of the upper and lower arms to turn on/off in opposite phase (double arm drive).

Figure 2:
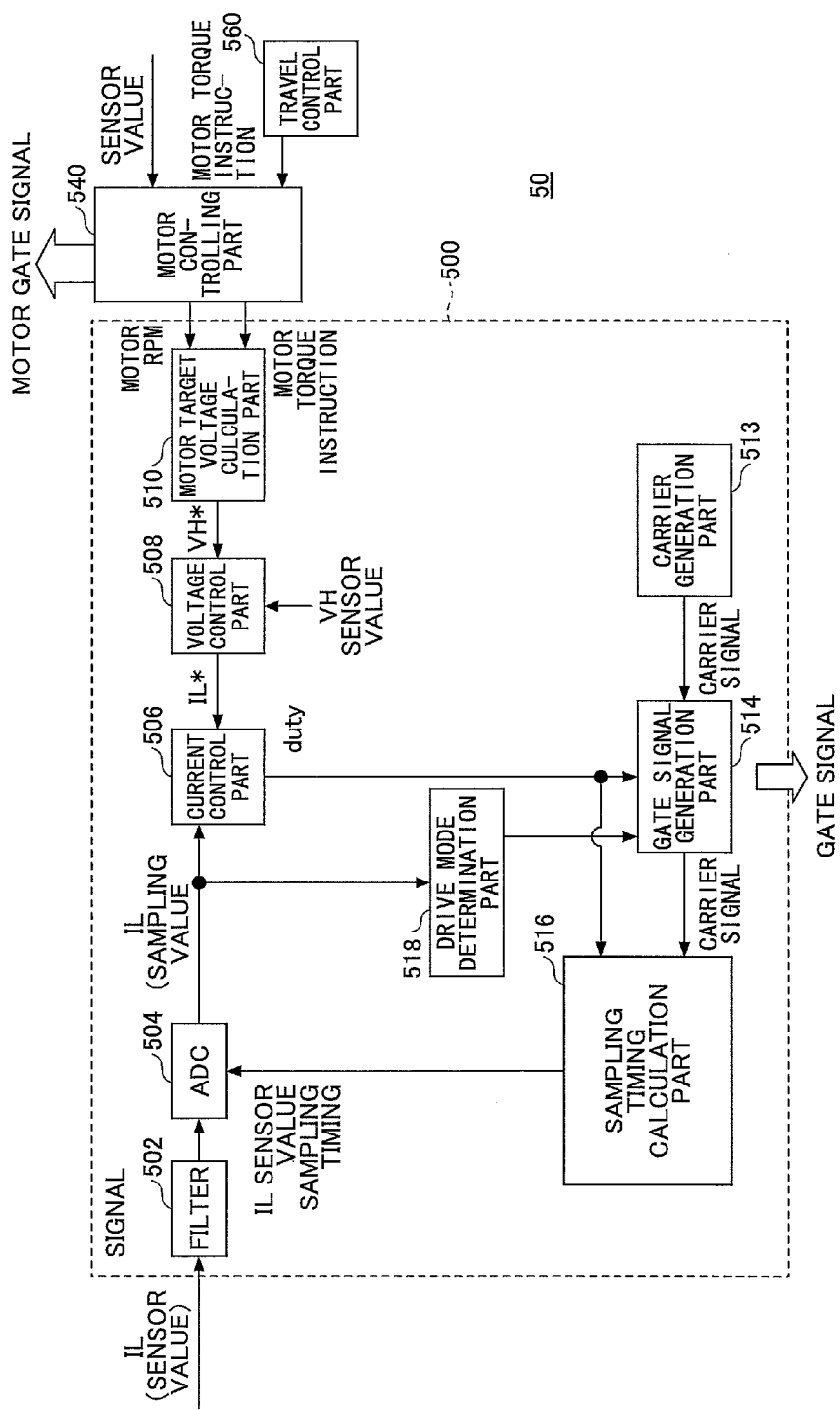
FIG. 2 is a diagram illustrating an example of a control block 500 of a DC/DC converter 20 of a semiconductor drive apparatus 50.

FIG. 2 is a diagram illustrating an example of a control block 500 of the DC/DC converter 20 of the semiconductor drive apparatus 50. The control block 500 may be formed of a microcomputer, for example. It is noted that, in FIG. 2, a part (a motor control part 540 and a travel control part 560) related to the control block 500 of the DC/DC converter 20 is also illustrated. It is noted that the motor control part 540 and the travel control part 560 may be implemented by an ECU that implements the control block 500, or another ECU other than the ECU that implements the control block 500.

It is noted that the control block 500 of the DC-DC converter 20 is mainly described hereinafter; however, a control block of the inverter 30 (i.e., respective functional parts of the motor control part 540) may have substantially the same configuration as the control block 500 of the DC-DC converter 20 described hereinafter (with respect to a current control part 506, a voltage control part 508, a carrier generation part 513, a gate signal generation part 514, a sampling timing calculation part 516, a drive mode determination part 518, etc., in particular). However, the motor control part 540 may include other functional parts such as a toque control part that generates an Id instruction and an Iq instruction based on a motor torque instruction, etc., a conversion part that converts phases between three phases and two phases, etc. It is noted that a fundamental configuration of the motor control part (a configuration except for functional parts corresponding to the sampling timing calculation part 516 and the drive mode determination part 518) may be arbitrary, as is the case with the control block 500 of the DC-DC converter 20. It is noted that an ADC of the motor control part 540 performs sampling of detection signals from respective current sensors (not illustrated) that detect the respective phase currents flowing through the coils of the respective phases.

The travel control part 560 determines, based on an accelerator position and a vehicle speed, for example, a motor torque instruction value (target drive torque) to supply the determined value to the motor control part 540. The motor control part 540 may generate, based on the motor torque instruction value or sensor values (detection values of respective phase currents of current sensors, a detection value of a motor rpm of a resolver, for example), gate signals (motor gate signals) for the ON/OFF switching of the switching elements Q1 through Q6 of the inverter 30. The motor gate signals may be applied to the gates of the switching elements Q1 through Q6.

The control block of the DC/DC converter 20 includes a filter 502, an ADC (Analog to Digital Converter) 504, a current control part 506, a voltage control part 508, a motor target voltage calculation part 510, a carrier generation part 513, a gate signal generation part 514, a sampling timing calculation part 516, and a drive mode determination part 518, as illustrated in FIG. 2.

A detection signal (analog signal) is input to the filter 502 from a current sensor (not illustrated) that detects a current (also referred to as "an inductor current IL", hereinafter) flowing through the inductor L1. The filter 502 filters the detection signal to output the filtered signal to the ADC 504.

The ADC 504 is initiated at sampling timing generated by the sampling timing calculation part 516 such that the ADC 504 samples the detection signal from the filter 502 at the sampling timing, thereby obtaining the sampled value (digital value) of the inductor current IL. The sampled value of the inductor current IL is supplied to the current control part 506 and the drive mode determination part 518.

The current control part 506 calculates the duty for driving (performing ON/OFF switching of) the switching elements Q22 and Q24 based on the sampled value of the inductor current IL from the ADC 504 and a target value IL* of the inductor current IL from the voltage control part 508. At that time, PI (Proportional Integral) control or PID (Proportional Integral Derivative) control may be used. The calculated duty is supplied to the gate signal generation part 514 and the sampling timing calculation part 516. It is noted that the target value IL* of the inductor current IL may be calculated in the voltage control part 508 based on a motor target voltage VH* and a detection value (VH sensor value) of the voltage VH across the smoothing capacitor C2. The motor target voltage VH* is a target value for the voltage VH across the smoothing capacitor C2. (see FIG. 1). The motor target voltage VH* may be calculated based on the motor rpm and the motor torque instruction value from the motor control part 540.

The carrier generation part 513 generates a reference signal with a predetermined frequency as a carrier signal. The carrier signal may have a waveform of a triangle wave or a rectangular wave. In the following, it is assumed that the carrier signal has the waveform of the triangle wave. The frequency of the carrier signal may be constant or varied. For example, the frequency of the carrier signal may be varied such that the frequency is decreased when a temperature of the DC/DC converter 20 is increased. The carrier signal is supplied to the gate signal generation part 514 and the sampling timing calculation part 516.

The gate signal generation part 514 generates, based on the carrier signal from the carrier generation part 513 and the duty from the current control part 506, gate signals for ON/OFF switching of the switching elements Q22 and Q24 of the DC/DC converter 20. The gate signals may be applied to the gates of the switching elements Q22 and Q24.

The sampling timing calculation part 516 determines, based on the carrier signal from the carrier generation part 513 and the duty from the current control part 506, the sampling timing for sampling (detecting) the inductor current IL, and transmits a signal, which represents the determined sampling timing, to the ADC 504. A way of determining the sampling timing may be arbitrary. For example, the sampling timing may be determined such that one sampling is performed every ON/OFF switching cycle of the switching elements Q22 and Q24. In this case, the sampling timing may be determined such that the average value of the current values of the inductor current IL during the corresponding ON/OFF period is sampled. An example of the way of determining the sampling timing is described hereinafter with reference to FIG. 5.

The drive mode determination part 518 switches a drive mode between a single arm drive mode and a double arm drive mode based on the sampling values of the inductor current IL from the ADC 504. The characterized portion of the way of performing the switching is described hereinafter.

FIG. 3 is a diagram illustrating an example of time series of ON/OFF states of the switching elements Q22 and Q24 that are switched based on the carrier signal and the duty. In FIG. 3 (A), from an upper side, an example of a relationship between the carrier signal and the duty, an example of the ON/OFF states of the switching elements Q22 and Q24 at the time of the powering operation, and an example of a waveform of the inductor current IL are schematically illustrated. In FIG. 3 (B), from an upper side, an example of a relationship between the carrier signal and the duty, an example of the ON/OFF states of the switching elements Q22 and Q24 at the time of the regenerating operation, and an example of a waveform of the inductor current IL are schematically illustrated.

At the time of the powering operation (except for at the time of the zero crossing event), only the switching element Q24 of the lower arm may be switched between the ON and OFF states while the switching element Q22 of the upper arm may be kept in the OFF state, as illustrated in FIG. 3 (A) (i.e., the single arm drive by the lower arm). In the example illustrated in FIG. 3 (A), the switching element Q24 of the lower arm is switched from the ON state to the OFF state when a level of the carrier signal exceeds a level of the duty, and switched from the OFF state to the ON state when the level of the carrier signal falls below the level of the duty.

When the switching element Q24 of the lower arm is turned ON, a current loop from the positive pole side of the battery 10 to the negative pole side of the battery 10 via the inductor L1 and the switching element Q24 is formed, which causes the inductor current IL to increase. At that time, the inductor current IL increases with a constant gradient, as illustrated in FIG. 3 (A). Next, when the switching element Q24 of the lower arm is turned off, the inductor L1 causes the current to continue to flow therethrough, which causes the current to flow to the side of the inverter 30 via the diode D22 of the upper arm. At that time, the inductor current IL decreases with a constant gradient, as illustrated in FIG. 3 (A). In this way, at the time of the powering operation, the inductor current IL alternately increases and decreases within a positive range while the gradient is changed at every ON/OFF switching event of the switching element Q24 of the lower arm. It is noted that the inductor current IL increases or decreases according to the duty such that the ON period of the switching element Q24 of the lower arm becomes longer, which causes the inductor current IL to increase, as the duty becomes greater.

At the time of the regenerating operation (except for at the time of the zero crossing event), only the switching element Q22 of the upper arm may be switched between the ON and OFF states while the switching element Q24 of the lower arm may be kept in the OFF state, as illustrated in FIG. 3 (B) (i.e., the single arm drive by the upper arm). In the example illustrated in FIG. 3 (B), the switching element Q22 of the upper arm is switched from the ON state to the OFF state when the level of the carrier signal exceeds the level of the duty, and switched from the OFF state to the ON state when the level of the carrier signal falls below the level of the duty.

When the switching element Q22 of the upper arm is turned ON, the current flows from the positive side of the inverter 30 to the positive pole side of the battery 10 via the switching element Q22 of the upper arm and the inductor L1. At that time, the inductor current IL decreases with a constant gradient (increases in a negative direction), as illustrated in FIG. 3 (B). Next, when the switching element Q22 of the upper arm is turned off, the inductor L1 causes the current to continue to flow therethrough, which causes the current to flow to the positive pole side of the battery 10 via the diode D24 of the lower arm. At that time, the inductor current IL increases with a constant gradient, as illustrated in FIG. 3 (B). In this way, at the time of the regenerating operation, the inductor current IL alternately increases and decreases within a negative range while the gradient is changed at every ON/OFF switching event of the switching element Q22 of the upper arm. It is noted that the inductor current IL increases or decreases according to the duty such that the ON period of the switching element Q22 of the upper arm becomes longer, which causes the inductor current IL to decrease (increase in the negative direction), as the duty becomes greater.

It is noted that, in the example illustrated in FIG. 3, the duty is constant; however, the duty is changed (set) at a predetermined duty setting cycle that corresponds to a half cycle of the carrier signal. The duty may be changed at a crest of the carrier signal (i.e., the peak on the upper side) and a trough of the carrier signal (i.e., the peak on the lower side).

Further, In the example illustrated in FIG. 3, the switching elements Q22 and Q24 are switched from the ON state to the OFF state when a level of the carrier signal exceeds a level of the duty, and switched from the OFF state to the ON state when the level of the carrier signal falls below the level of the duty; however, the reversed manner may be used. Specifically, the switching elements Q22 and Q24 may be switched from the OFF state to the ON state when a level of the carrier signal exceeds a level of the duty, and switched from the ON state to the OFF state when the level of the carrier signal falls below the level of the duty.

Figure 4:
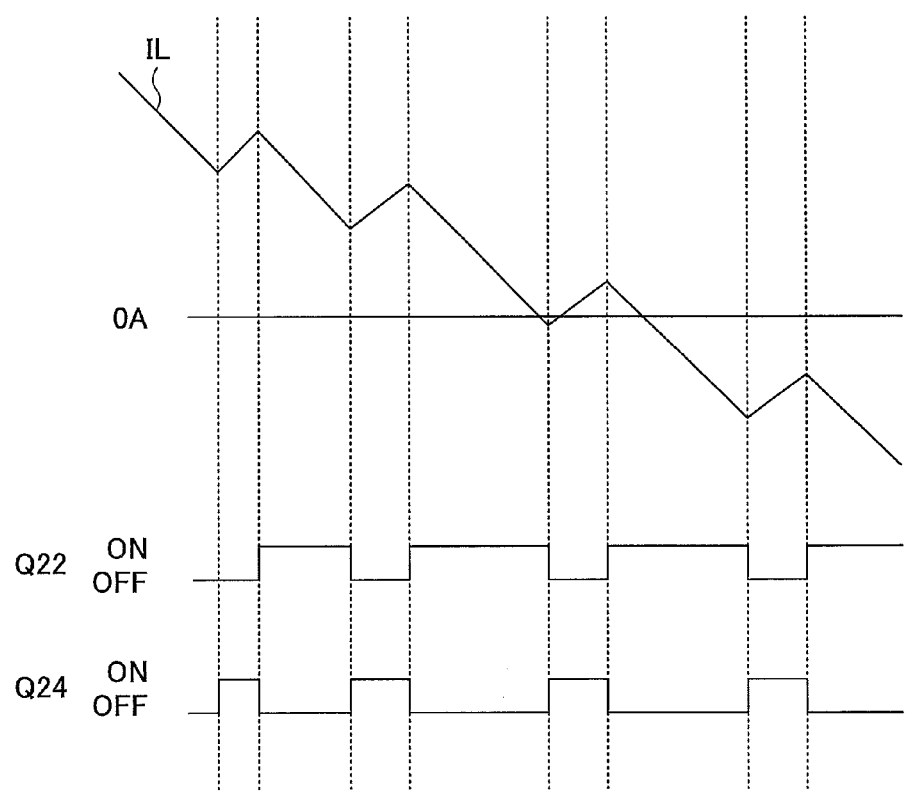
FIG. 4 is a diagram illustrating an example of a time series of the ON/OFF states of the switching elements Q22 and Q24 at the time of performing a double arm drive.

FIG. 4 is a diagram illustrating an example of a time series of the ON/OFF states of the switching elements Q22 and Q24 at the time of performing the double arm drive. In FIG. 4, from the upper side, an example of a waveform of the inductor current IL at the time when the current flowing through inductor L1 crosses 0 A (i.e., at the time of the zero crossing event), and an example of the ON/OFF states of the switching elements Q22 and Q24 are schematically illustrated.

At the time of the double arm drive operation, the switching elements Q22 and Q24 are switched between the ON and OFF states in a reversed phase with an appropriate dead time (not illustrated) therebetween, as illustrated in FIG. 4. The double arm drive is performed at the time of the zero crossing event when the inductor current IL crosses 0 A, for example. It is noted that the example illustrated in FIG. 4 is related to the zero crossing event when the inductor current IL transitions from a positive range to a negative range (i.e., at the time of the transition from the powering operation to the regenerating operation); however, this holds true for the zero crossing event when the inductor current IL transitions from a negative range to a positive range (i.e., at the time of the transition from the regenerating operation to the powering operation).

It is noted that, at the time of performing the double arm drive, a gate interference occurs when the switching element Q22 turns on because the current flows through the diode D22 of the upper arm due to the fact that the switching element Q24 transitions from the ON state to the OFF state. Further, another gate interference occurs when the switching element Q24 turns on because the current flows through the diode D24 of the lower arm due to the fact that the switching element Q23 transitions from the ON state to the OFF state. Such a gate interference occurs, in particular, when RC-IGBTs used to form the switching element Q22 and the diode D22, and the switching element Q23 and the diode D23, respectively.

Figure 5:
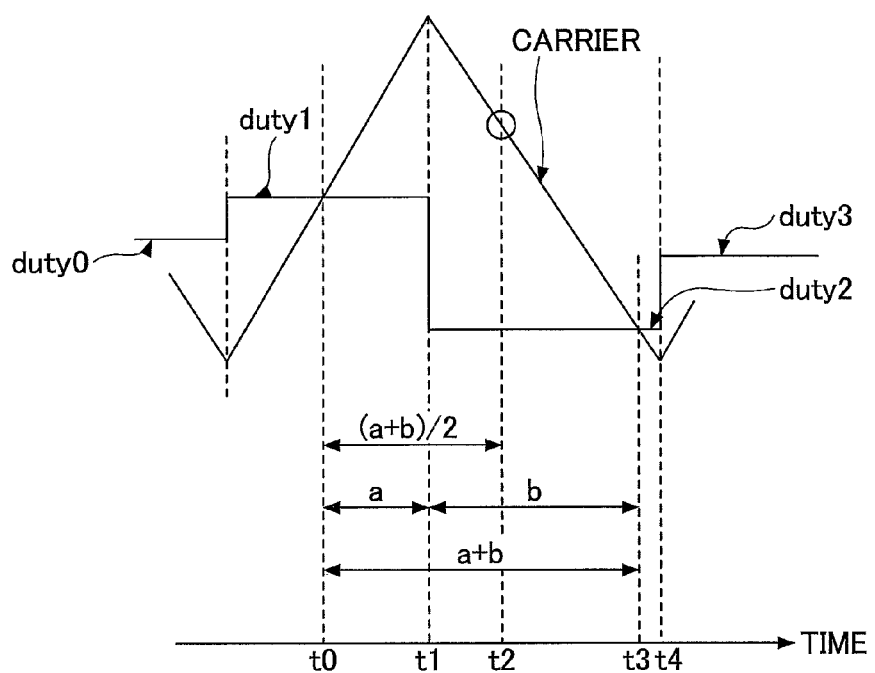
FIG. 5 is a diagram illustrating an example of a way of determining sampling timing.

FIG. 5 is a diagram illustrating an example of a way of determining the sampling timing. In FIG. 5, the carrier signal, and levels according to the values of the duty (duty 0, duty 1, duty 2, and duty 3) calculated by the current control part 506 are illustrated. Here, as an example, the switching element Q22 (at the time of the regenerating operation illustrated in FIG. 3 (B)) is explained; however, the explanation may hold true for the switching element Q24 (at the time of the powering operation illustrated in FIG. 3 (A)). It is noted that at the time of the double-arm drive operation, the explanation may hold true for one of the switching elements Q22 and Q24.

In the example illustrated in FIG. 5, the level of the carrier signal exceeds the level of the duty At a time point t0, which causes the switching element Q22 to turn off, which in turn causes the OFF period to start. At a time point t1, the duty is changed (set) from the value "duty1" to the value "duty2" according to the occurrence of the crest of the carrier signal. At a time point t3, the level of the carrier signal falls below the level of the duty, which causes the switching element Q22 to turn on, which in turn causes the OFF period from time point t1 to end (i.e., the ON period to start). At a time point t4, the duty is changed (set) from the value "duty2" to the value "duty3") according to the occurrence of the trough of the carrier signal.

As described above, the sampling timing is determined such that the average value of the current values of the inductor current IL during the corresponding ON/OFF period is sampled. Specifically, the sampling timing may be set at a midpoint during the ON/OFF period. In the example illustrated in FIG. 5, the midpoint during the OFF period (from time point t0 to time point t3) this time corresponds to time point t2. In the example illustrated in FIG. 5, a position corresponding to the sampling timing is indicated by a white circle on the carrier signal. When the time from the start point of the OFF period (i.e., time point t0) to the crest of the carrier signal is "a", and the time from the crest of the carrier signal to the end point of the OFF period (i.e., time point t3) is "b", the sampling timing is set at a time point that is after the time "(a+b)/2" from the start point of the OFF period (i.e., time point t0).

It is noted that the midpoint during the ON/OFF period may mean a midpoint based on reverse timing the gate signals for the switching elements Q22 and Q24, or may strictly mean a midpoint based on the conducting states of the switching elements Q22 and Q24. Further, the sampling timing may be offset in a forward or backward direction with respect to the midpoint during the ON/OFF period.

Figure 26:
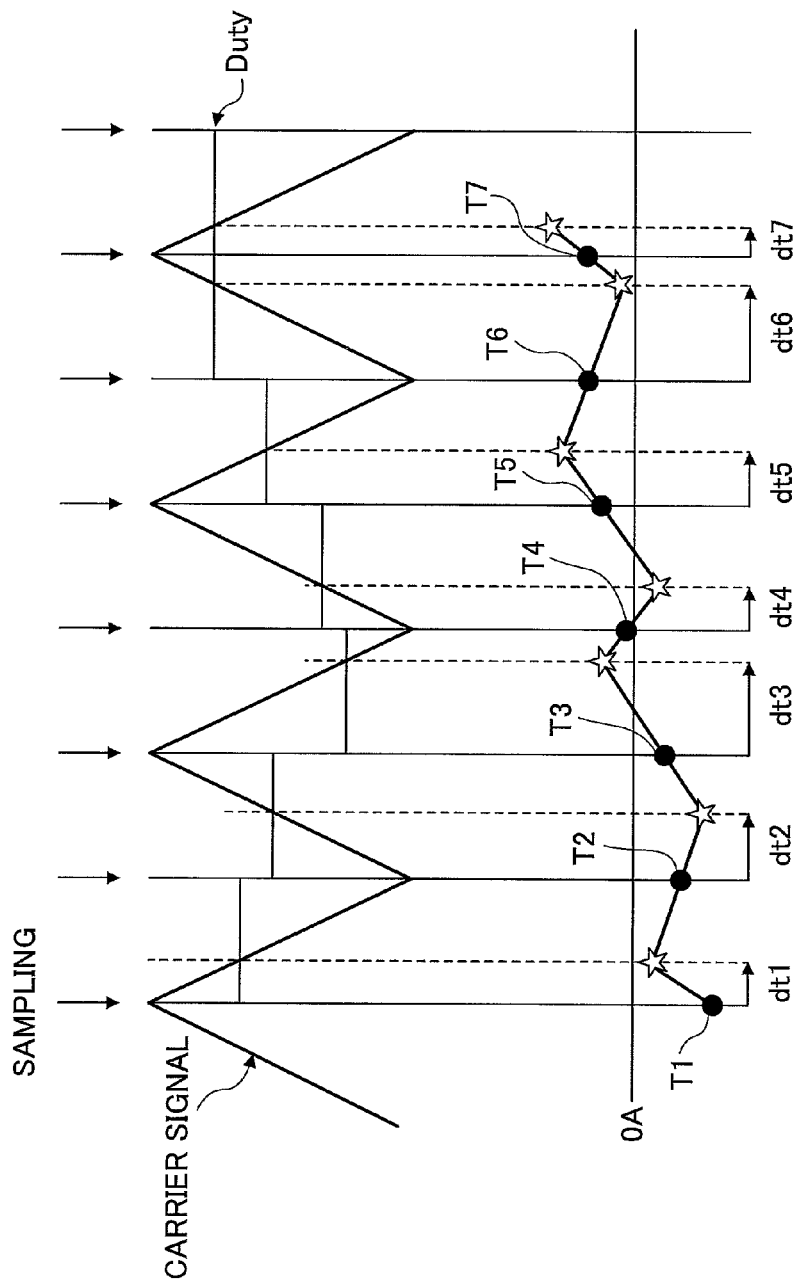
FIG. 26 is a diagram illustrating an example of a relationship between a sampling timing and timings of a local maximum or a local minimum of the U-phase current Iu.

It is noted that, in the example illustrated in FIG. 5, the sampling timing is determined such that the average value of the current values of the inductor current IL during the corresponding ON/OFF period is sampled; however, the sampling timing may correspond to the timing at a crest of the carrier signal (i.e., the peak on the upper side) and the timing at a trough of the carrier signal (i.e., the peak on the lower side) (see FIG. 26).

Figure 6:
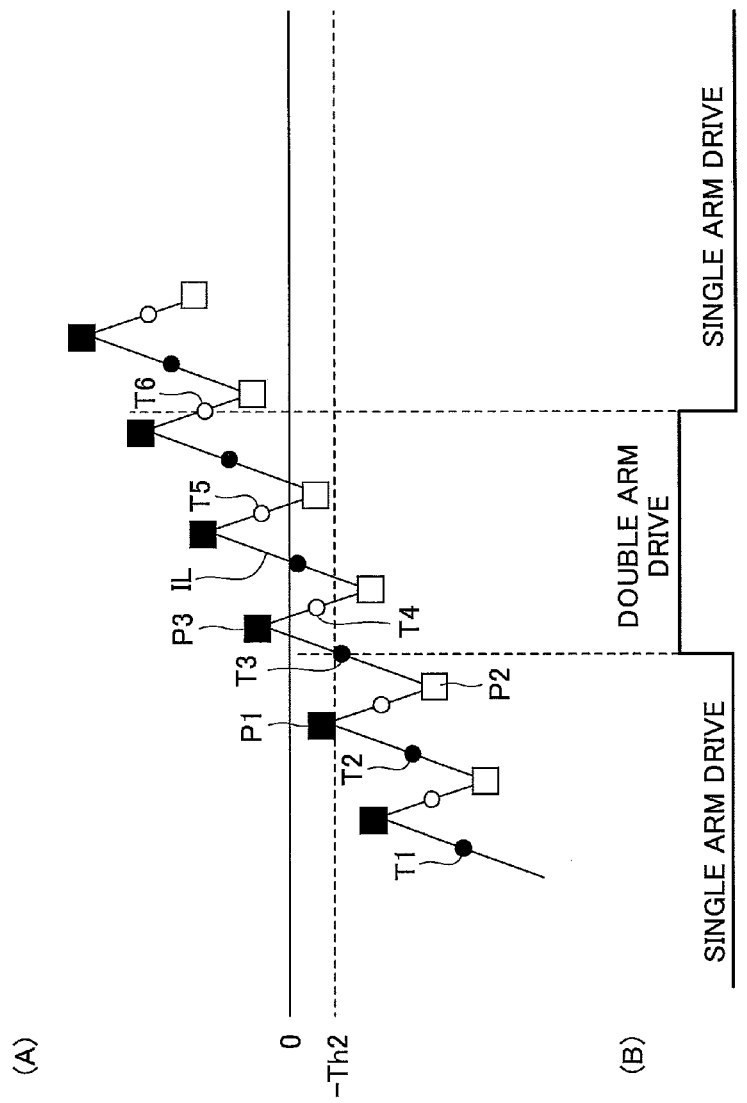
FIG. 6 is a diagram illustrating an example of a switching timing between the single arm drive mode and the double arm drive mode by a drive mode determination part 518.

FIG. 6 is a diagram illustrating an example of a switching timing between the single arm drive mode and the double arm drive mode by a drive mode determination part 518. FIG. 6 is a diagram illustrating time series of waveforms when the inductor current IL increases from the negative region to the positive region. In FIG. 6, (A) illustrates an example of a waveform of the inductor current IL, and (B) illustrates an example of a switching manner between the single arm drive mode and the double arm drive mode. It is noted that, as an example, a case where the inductor current IL increases from the negative region to the positive region is described hereinafter; however, the same holds true for a case where the inductor current IL decreases from the positive region to the negative region.

In FIG. 6, a manner in which the inductor current including the ripple components increase from the negative region to the positive region (i.e., the transition from the regenerating operation to the powering operation) is illustrated. It is noted that the ripple components are generated due to the ON/OFF switching of the switching elements Q22 and Q24 as described above (see FIG. 3). On the waveform of the inductor current, white circle marks indicate sampling timing during the period in which the decreasing ripple component is generated, and black circle marks indicate sampling timing during the period in which the increasing ripple component is generated. White rectangular marks correspond to the local minimums of the inductor current IL, and black rectangular marks correspond to the local maximums of the inductor current IL. It is noted that the "local maximums" and the "local minimums" are the "local maximums" and the "local minimums" due to the ripple components (i.e., the "local maximum" and the "local minimum" are generated at a cycle of a carrier period), and does not means a "maximum" and a "minimum" over the overall waveform.

The drive mode determination part 518, as described hereinafter, predicts a time rate of change of the inductor current IL based on a voltage VH across the switching elements Q22 and Q24 (i.e., the output voltage of the DC-DC converter 20), an inductance Lc of the inductor L1 and a voltage Vb of the battery 10; predicts the local maximum or the local minimum of the inductor current IL based on the predicted time rate of change; and switches the drive mode of the switching elements Q22 and Q24 between the single arm drive mode and the double arm drive mode based on the relationship between 0 and the predicted local maximum or local minimum.

A way of predicting the time rate of change (di/dt) of the inductor current IL is arbitrary; however, it may be as expressed by the following formula (2), based on the following relationship indicated by the formula (1), for example.

$$VH = Lc \times di/dt + Vb \qquad \text{formula (1)}$$

$$\text{time rate of change } (di/dt) \text{ of inductor current } IL = (VH-Vb)/Lc \qquad \text{formula (2)}$$

Here, a detection value of a voltage sensor for detecting the output voltage VH may be used as the output voltage VH of the DC-DC converter 20. A detection value of a voltage sensor for detecting the voltage Vb of the battery 10 may be used as the voltage Vb of the battery 10. It is noted that these voltage sensors may be also used for another purpose. A value of an inductance Lc (derived based on experiment, simulation, etc.) at the time of the zero crossing event may be used as the inductance Lc of the inductor L1.

The local maximum of the inductor current IL may be calculated based on the time rate of change of the inductor current IL as follows. Local maximum=IL (black circle mark)+time rate of change (di/dt) of inductor current IL×ΔT. Here, IL (black circle mark) corresponds to a sampling value of the inductor current IL obtained at the sampling timing of the black circle mark. ΔT corresponds to a time (also referred to as "dt time" hereinafter) from the sampling timing of the black circle mark in question to the timing when the next local maximum of the inductor current IL appears, and can be calculated based on a relationship between the carrier signal and the duty at the sampling timing of the black circle mark in question. For example, in the example illustrated in FIG. 5, ΔT=(a+b)/2.

The local minimum of the inductor current IL may be calculated based on the time rate of change of the inductor current IL as follows. Local minimum=IL (white circle mark)+time rate of change (di/dt) of inductor current IL×ΔT. Here, IL (white circle mark) corresponds to a sampling value of the inductor current IL obtained at the sampling timing of the white circle mark. ΔT corresponds to a time (i.e., a dt time) from the sampling timing of the white circle mark in question to the timing when the next local minimum of the inductor current IL appears, and can be calculated based on the relationship between the carrier signal and the duty at the sampling timing of the white circle mark in question. For example, in the example illustrated in FIG. 5, ΔT=(a+b)/2.

In the example illustrated in FIG. 6, during the single arm drive mode in the course of the transition from the regenerating operation to the powering operation, the corresponding next local maximums of the inductor current IL (black rectangular marks) are predicted at the respective sampling timing T1, T2 and T3 at black circle marks, and the single arm drive mode is continued when the predicted local maximum of the inductor current IL is smaller than 0 (see T1 and T2). On the other hand, when the predicted local maximum of the inductor current IL is greater than 0, the drive mode is switched from the single arm drive mode to the double arm drive mode (see T3).

Further, during the double arm drive mode in the course of the transition from the regenerating operation to the powering operation, the corresponding next local minimums of the inductor current IL (white rectangular marks) are predicted at the respective sampling timing T4, T5 and T6 at white circle marks, and the double arm drive mode is continued when the predicted local minimum of the inductor current IL is smaller than 0 (see T4 and T5). On the other hand, when the predicted local maximum of the inductor current IL is greater than 0, the drive mode is switched from the double arm drive mode to the single arm drive mode (see T6).

It is noted that in the example illustrated in FIG. 6, it is determined by the prediction whether the next local maximum of the inductor current IL exceeds 0; however, it may be determined by the prediction whether the next local maximum of the inductor current IL exceeds a predetermined threshold "−Th2" that is smaller than 0. The predetermined threshold "−Th2" may be slightly smaller than 0.

Further, in the example illustrated in FIG. 6, one sampling timing is set at every half period of the carrier signal; however, the sampling timing may be increased and the same prediction may be performed at another sampling timing. For example, the sampling timing may be added in synchronization with the ON/OFF timing of the switching elements Q22 and Q24 of the DC-DC converter 20. The sampling timing synchronized with the ON/OFF timing of the switching elements Q22 and Q24 of the DC-DC converter 20 includes the timing when the level of the carrier signal exceeds the level of the duty, and the timing when the level of the carrier signal falls below the level of the duty. In this case, at such a sampling timing, the same prediction for the next local maximum or local minimum may be performed. It is noted that, in the case where the next local maximum is predicted at the timing when a certain local minimum is obtained as well as in the case where the next local minimum is predicted at the timing when a certain local maximum is obtained, the dt time ΔT is substantially the same as a gate ON time of the corresponding switching elements Q22 and Q24.

Further, in the example illustrated in FIG. 6, the prediction process of the time rate of change (di/dt) of the inductor current IL (and thus the calculation process of the local maximum/minimum value of the inductor current IL and the zero crossing determination process) may be initiated when the absolute value of the sampling value of the inductor current IL becomes less than or equal to a predetermined first threshold Th1 during the single arm drive mode in the course of the transition from the regenerating operation to the powering operation. With this arrangement, the process load can be efficiently suppressed. The predetermined first threshold Th1 may correspond to the half of the maximum value (or a value obtained by adding a margin to the maximum value) of the possible amplitude (ripple amplitude) of the ripple components of the inductor current IL, for example. It is noted that the absolute value of the predetermined threshold "−Th2" is smaller than that of the predetermined first threshold Th1. Further, similarly, the prediction process of the time rate of change (di/dt) of the inductor current IL may be ended when the switching from the double arm drive mode to the single arm drive mode has been implemented as described above during the double arm drive mode in the course of the transition from the regenerating operation to the powering operation. With this arrangement, the process load can be efficiently suppressed.

Figure 7:
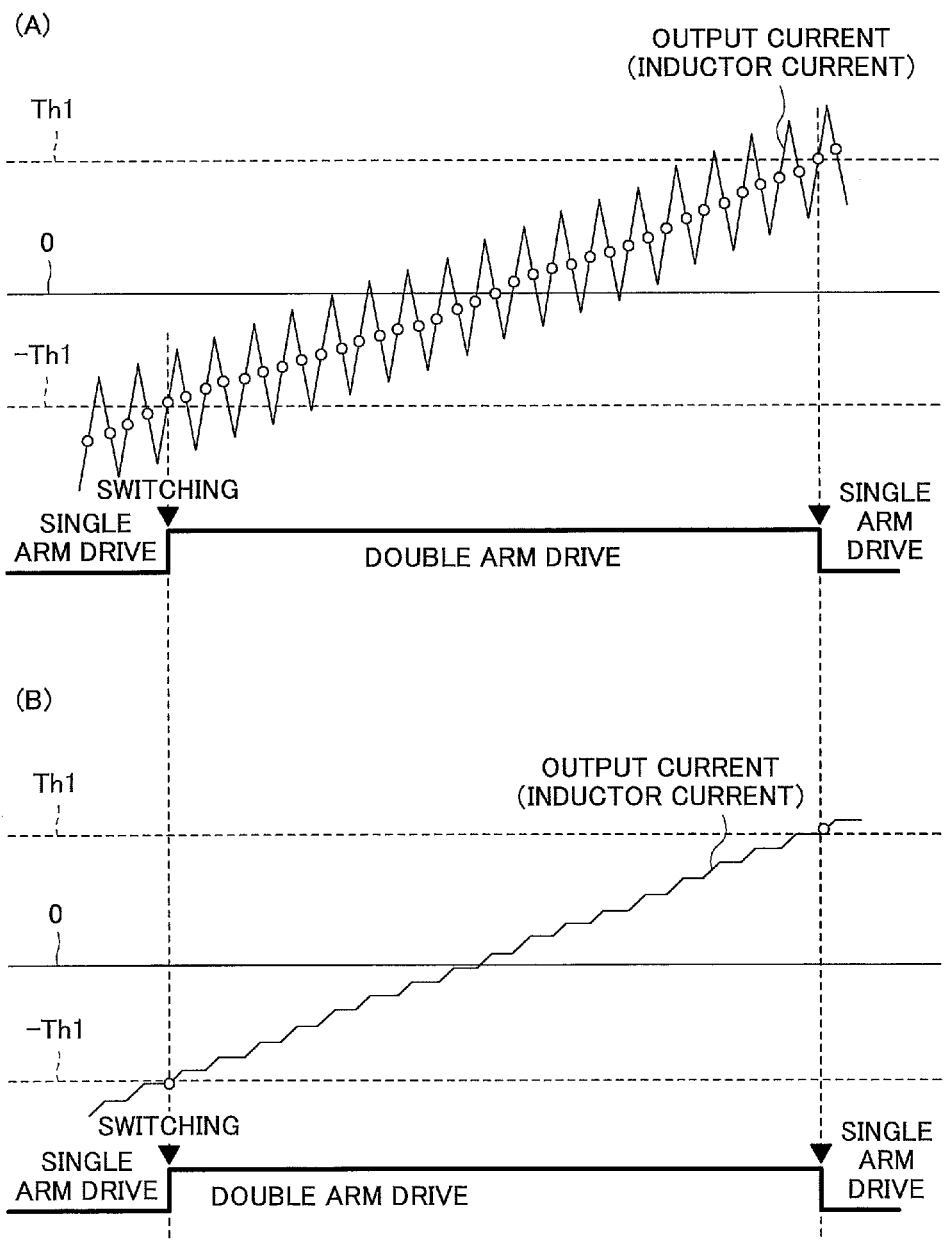
FIG. 7 is a diagram illustrating a way of switching between the single arm drive mode and the double arm drive mode according to a comparative example.

FIG. 7 is a diagram illustrating a way of switching between the single arm drive mode and the double arm drive mode according to a comparative example. In FIG. 7, (A) illustrates a case where the ripple component is great, and (B) illustrates a case where the ripple component is small. In the comparative example, an ordinary sampling mode is always kept, and the frequency of the carrier signal is always constant. Further, in the comparative example, when the absolute value of the sampling value of the inductor current IL obtained at the sampling timing (white circle marks) becomes less than or equal to the predetermined first threshold Th1 (i.e., the sampling value of the inductor current IL becomes greater than or equal to "−Th1"), the switching from the single arm drive mode to the double arm drive mode is performed as illustrated in FIG. 7. Once the switching to the double arm drive mode is thus performed, the drive mode is not returned to the single arm drive mode from the double arm drive mode until the absolute value of the sampling value of the inductor current IL obtained at the sampling timing (white circle marks) becomes greater than the predetermined first threshold Th1 (i.e., the sampling value of the inductor current IL becomes greater than Th1). In this way, according to the comparative example illustrated in FIG. 7, as illustrated in FIGS. 7 (A) and (B), the period during which the double arm drive is performed becomes relatively long, which means that the loss due to the gate interference is constantly generated by a constant percentage, regardless of the magnitude of the ripple component.

FIG. 8 is a diagram illustrating a way of switching between the single arm drive mode and the double arm drive mode according to the embodiment in contrast with FIG. 7. In FIG. 8, (A) illustrates a case where the ripple component is great, and (B) illustrates a case where the ripple component is small.

As apparent if FIG. 8 is contrasted to FIG. 7, according to the embodiment, it becomes possible to shorten the period during which the double arm drive is performed and thus reduce the loss due to the gate interference, because the time rate of change of the inductor current IL is predicted and the local maximum value or the local minimum value of the inductor current IL is predicted based on the predicted time rate of change. More specifically, the local maximum value or the local minimum value of the inductor current IL is predicted based on the predicted time rate of change, which enables predicting, with high accuracy, a zero crossing start timing of the inductor current IL (i.e., the timing when the value of the inductor current IL exceeds 0 in the case of the transition from the regenerating operation to the powering operation) as well as a zero crossing end timing of the inductor current IL (i.e., the timing when the value of the inductor current IL does not fall below 0 in the case of the transition from the regenerating operation to the powering operation). Thus, it becomes possible to shorten the period during which the double arm drive is performed and thus reduce the loss due to the gate interference.

It is noted that the embodiment described above is related to the control for the upper and lower arms of the DC-DC converter 20; however, as described hereinafter, it can be also applied to the control of the switching elements Q1 and Q2 (upper and lower arms) related to the U-phase of the inverter 30, the control of the switching elements Q3 and Q4 (upper and lower arms) related to the V-phase of the inverter 30 and the control of the switching elements Q5 and Q6 (upper and lower arms) related to the W-phase of the inverter 30.

Figure 9:
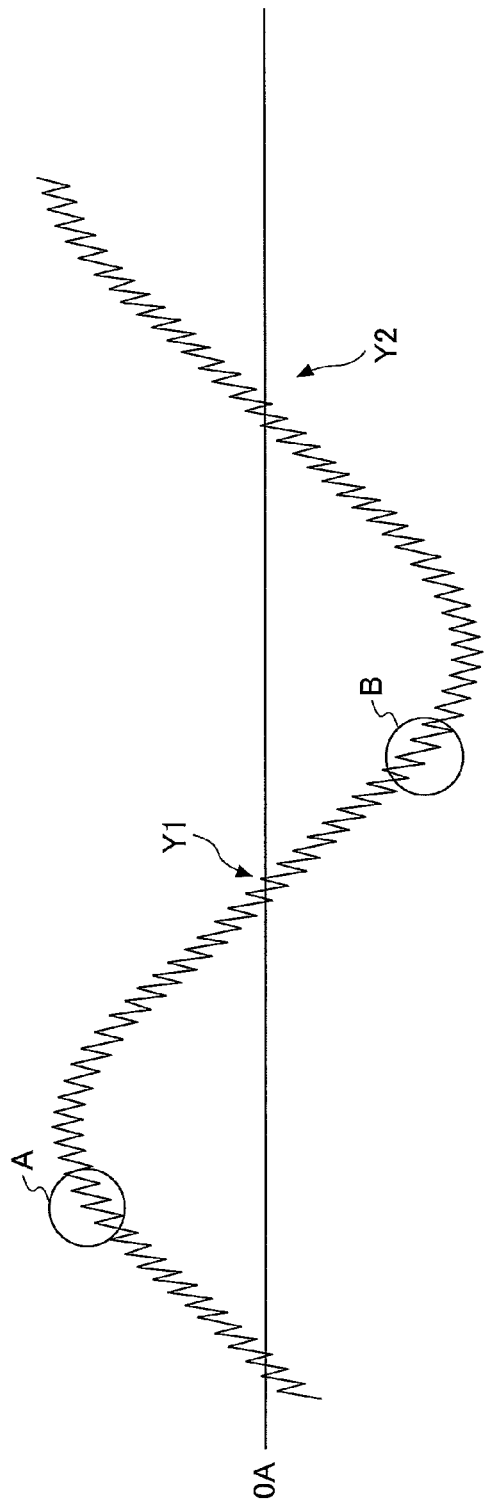
FIG. 9 is a diagram illustrating an example of a wave shape of a current (U-phase current) flowing through an U-phase coil of an inverter 30.

FIG. 9 is a diagram schematically illustrating an example of a wave shape of a current (U-phase current) flowing through an U-phase coil of an inverter 30. It is noted that, in the following, as a representative example, the explanation is made with respect to the current (U-phase current) flowing through the U-phase coil of the inverter 30; however, the same holds true for the V-phase and the W-phase.

The U-phase current includes the ripple component due to the PWM control, as is the case with the inductor current IL described above, though the ripple component is illustrated in the relatively exaggerated manner in FIG. 9.

Figure 10:
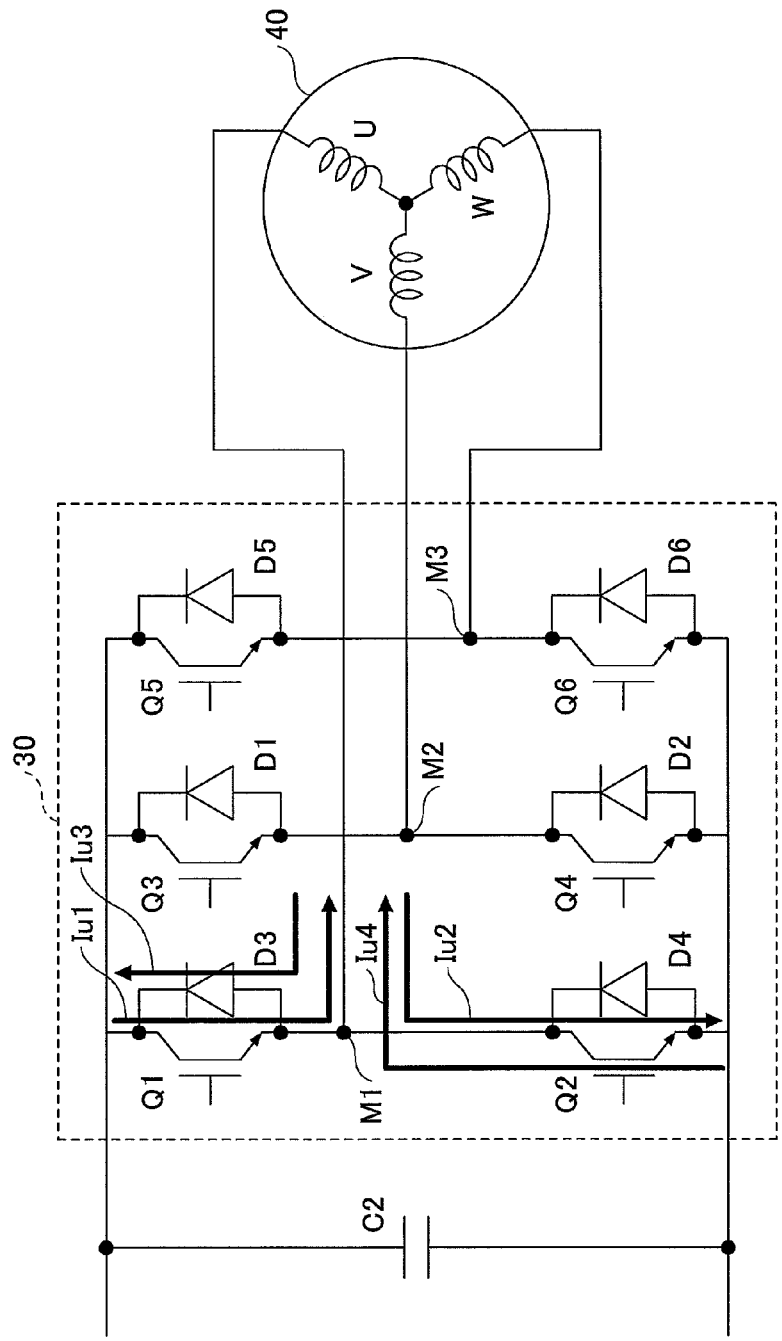
FIG. 10 is a diagram for explaining a direction of the U-phase current of the inverter 30.

FIG. 10 is a diagram for explaining a direction of the U-phase current of the inverter 30. FIG. 11(A) is a diagram illustrating an example of ON/OFF states of switching elements Q1 and Q2 that are switched based on the relationship between the carrier signal and the duty in "A" portion in FIG. 9, and FIG. 11(B) is a diagram illustrating an example of ON/OFF states of switching elements Q1 and Q2 that are switched based on the relationship between the carrier signal and the duty in "B" portion in FIG. 9.

Figure 11:
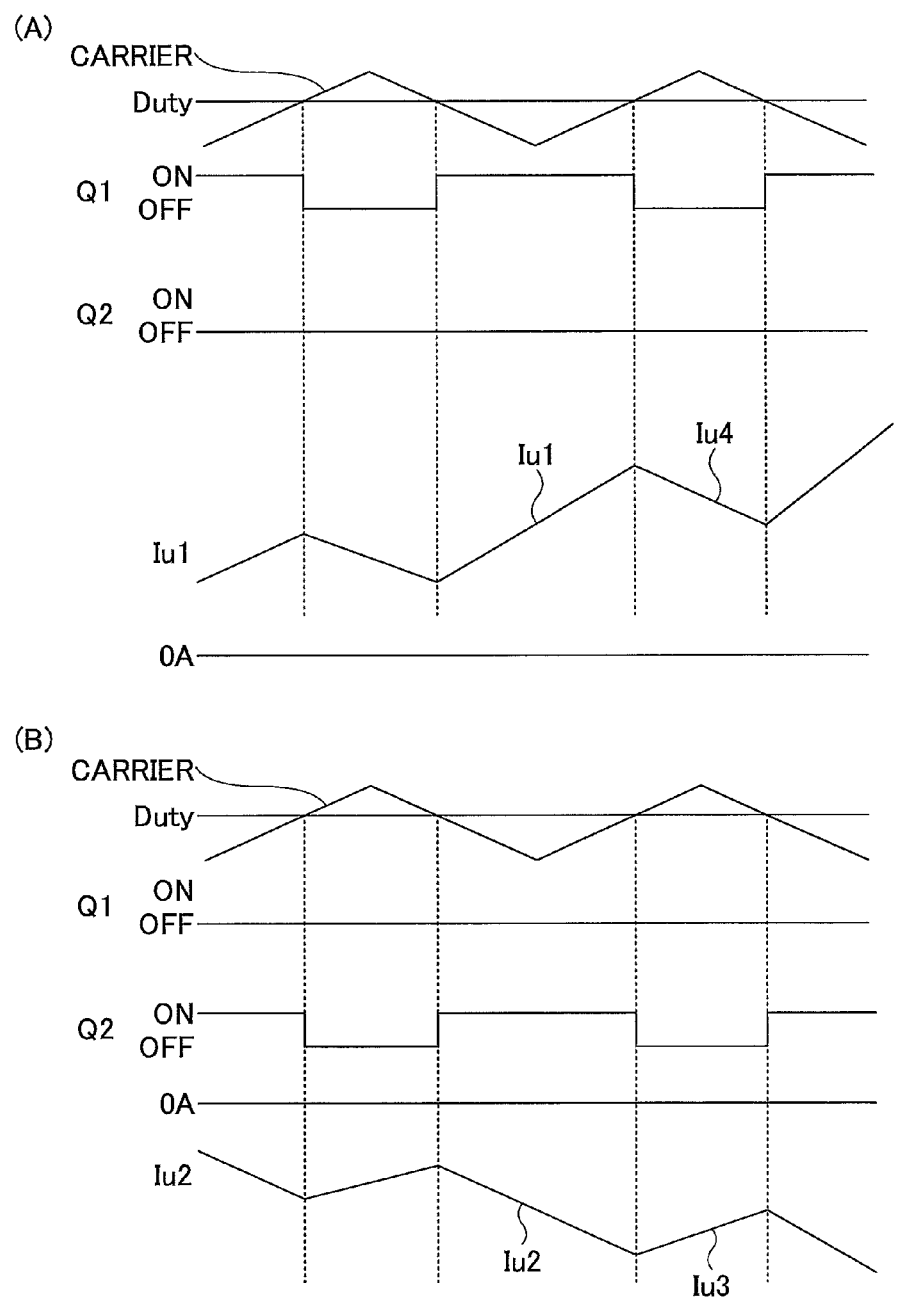
FIG. 11 is a diagram illustrating an example of ON/OFF states of switching elements Q1 and Q2 that are switched based on a carrier signal and a duty in A and B portions in FIG. 9.

In the case where the U-phase current is in the positive region (except for at the time of the zero crossing event), only the switching element Q1 of the upper arm may be switched between the ON and OFF states while the switching element Q2 of the lower arm may be kept in the OFF state, as illustrated in FIG. 11 (A) (i.e., the single arm drive by the upper arm). In the example illustrated in FIG. 11 (A), the switching element Q1 of the upper arm is switched from the ON state to the OFF state when a level of the carrier signal exceeds a level of the duty, and switched from the OFF state to the ON state when the level of the carrier signal falls below the level of the duty.

When the switching element Q1 of the upper arm turns on, the current flows from the positive side of the battery 10 to the U-phase coil via the inductor L1, the switching element Q22 and the switching element Q1 of the upper arm (see Iu1 in FIG. 10), and thus the U-phase current Iu increases in the positive direction as illustrated in FIG. 11 (A). Then, when the switching element Q1 of the upper arm turns off, the current that tends to continue to flow through the U-phase boil flows to the U-phase coil via the diode D4 of the lower arm (see Iu4 in FIG. 10). At that time, the U-phase current Iu in the positive direction decreases with a constant gradient, as illustrated in FIG. 11 (A). In this way, the U-phase current Iu in the positive direction alternately increases and decreases within the positive range while the gradient is changed at every ON/OFF switching event of the switching element Q1 of the upper arm. It is noted that the U-phase current Iu in the positive direction increases or decreases according to the duty such that the ON period of the switching element Q1 of the upper arm becomes longer, which causes the U-phase current Iu (amplitude) in the positive direction to increase, as the duty becomes greater.

In the case where the U-phase current is in the negative region (except for at the time of the zero crossing event), only the switching element Q2 of the lower arm may be switched between the ON and OFF states while the switching element Q1 of the upper arm may be kept in the OFF state, as illustrated in FIG. 11 (B) (i.e., the single arm drive by the lower arm). In the example illustrated in FIG. 11 (B), the switching element Q2 of the lower arm is switched from the ON state to the OFF state when the level of the carrier signal exceeds the level of the duty, and switched from the OFF state to the ON state when the level of the carrier signal falls below the level of the duty.

When the switching element Q2 of the lower arm turns on, the current flows from the U-phase coil to a ground side via the switching element Q2 of the lower arm (see Iu2 in FIG. 10), and thus the U-phase current Iu increases in the negative direction as illustrated in FIG. 11 (B). Then, when the switching element Q2 of the lower arm turns off, the current that tends to continue to flow through the U-phase coil flows to the positive side via the diode D3 of the upper arm (see Iu3 in FIG. 10). At that time, the U-phase current Iu in the negative direction decreases with a constant gradient, as illustrated in FIG. 11 (B). In this way, the U-phase current Iu in the negative direction alternately increases and decreases within the negative range while the gradient is changed at every ON/OFF switching event of the switching element Q2 of the lower arm. It is noted that the U-phase current Iu in the negative direction increases or decreases according to the duty such that the ON period of the switching element Q2 of the lower arm becomes longer, which causes the U-phase current Iu (amplitude) in the negative direction to increase, as the duty becomes greater.

Figure 12:
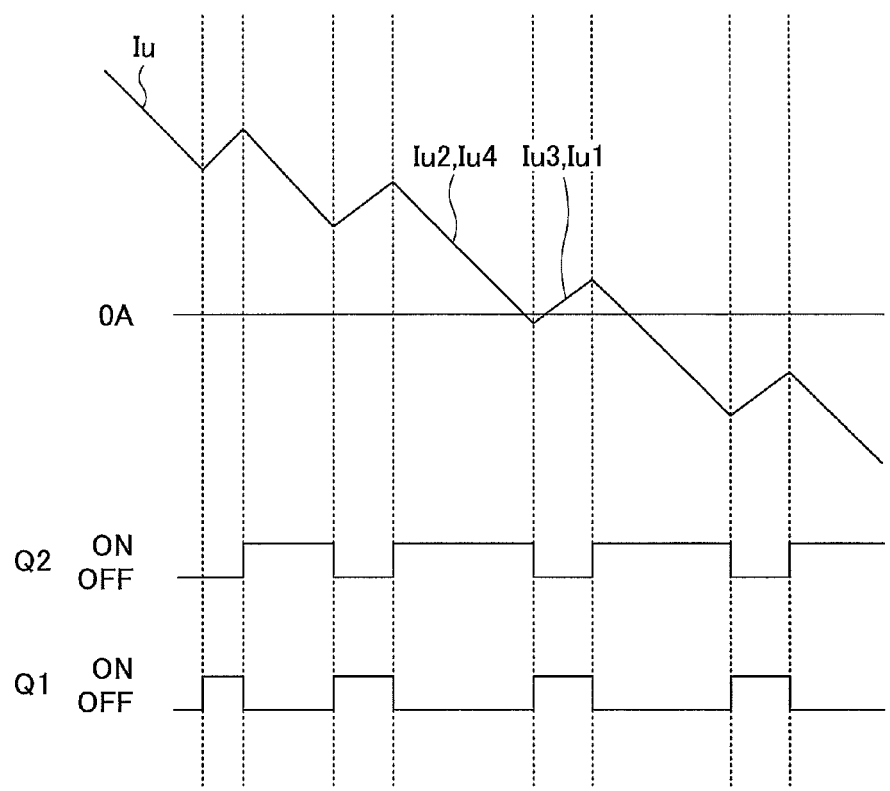
FIG. 12 is a diagram illustrating an example of a time series of the ON/OFF states of the switching elements Q1 and Q2 at the time of performing the double arm drive.

FIG. 12 is a diagram illustrating an example of a time series of the ON/OFF states of the switching elements Q22 and Q24 at the time of performing the double arm drive. In FIG. 12, from the upper side, an example of a waveform of the U-phase current Iu at the time when the U-phase current Iu crosses 0 A (i.e., at the time of the zero crossing event), and an example of the ON/OFF states of the switching elements Q1 and Q2 are schematically illustrated.

At the time of the double arm drive operation, the switching elements Q1 and Q2 are switched between the ON and OFF states in a reversed phase with an appropriate dead time (not illustrated) therebetween, as illustrated in FIG. 12. The double arm drive is performed at the time of the zero crossing event when the U-phase current Iu crosses 0 A, for example. It is noted that the example illustrated in FIG. 12 is related to the zero crossing event when the U-phase current Iu transitions from the positive range to the negative range (see Y1 in FIG. 9); however, this holds true for the zero crossing event when the U-phase current Iu transitions from the negative range to the positive range (see Y2 in FIG. 9).

It is noted that, at the time of performing the double arm drive, the gate interference occurs when the switching element Q1 turns on because the current flows through the diode D3 of the upper arm due to the fact that the switching element Q2 transitions from the ON state to the OFF state (see Iu3 in FIG. 11). Further, another gate interference occurs when the switching element Q2 turns on because the current flows through the diode D4 of the lower arm due to the fact that the switching element Q1 transitions from the ON state to the OFF state (see Iu4 in FIG. 11). Such a gate interference occurs, in particular, when the RC-IGBTs are used to form the switching element Q1 and the diode D3, and the switching element Q2 and the diode D4, respectively.

Figure 13:
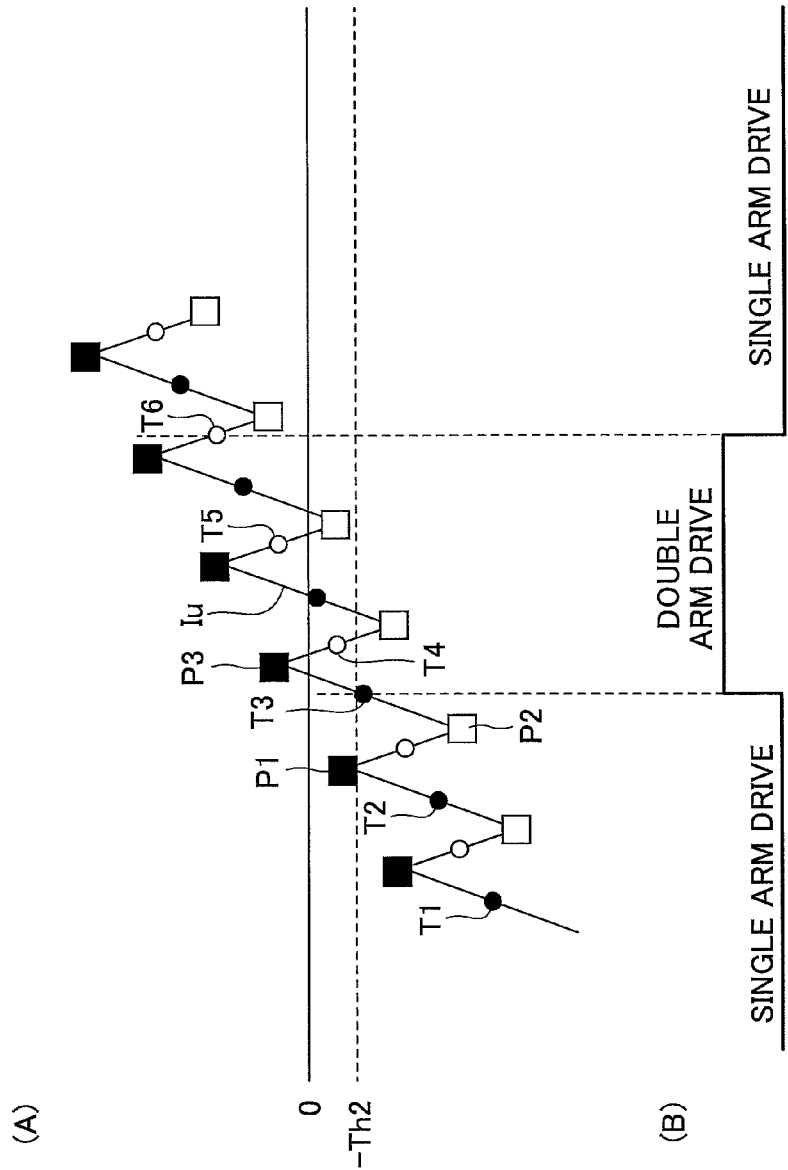
FIG. 13 is a diagram illustrating an example of a switching timing between the single arm drive mode and the double arm drive mode by a motor control part 540.

FIG. 13 is a diagram illustrating an example of a switching timing between the single arm drive mode and the double arm drive mode by the motor control part 540. FIG. 13 is a diagram illustrating time series of waveforms when the U-phase current Iu increases from the negative region to the positive region. In FIG. 13, (A) illustrates an example of a waveform of the U-phase current Iu, and (B) illustrates an example of a switching manner between the single arm drive mode and the double arm drive mode. It is noted that, as an example, a case where the U-phase current Iu increases from the negative region to the positive region is described hereinafter; however, the same holds true for a case where the U-phase current Iu decreases from the positive region to the negative region. Further, the same holds true for the V-phase and the W-phase.

In FIG. 13, a manner in which the U-phase current Iu including the ripple components increases from the negative region to the positive region is illustrated. It is noted that the ripple components are generated due to the ON/OFF switching of the switching elements Q1 and Q2 as described above (see FIG. 11). On the waveform of the U-phase current, white circle marks indicate sampling timing during the period in which the decreasing ripple component is generated, and black circle marks indicate sampling timing during the period in which the increasing ripple component is generated. White rectangular marks correspond to the local minimums of the U-phase current Iu, and black rectangular marks correspond to the local maximums of the U-phase current Iu. It is noted that, as described above, the "local maximums" and the "local minimums" are the "local maximums" and the "local minimums" due to the ripple components (i.e., the "local maximum" and the "local minimum" are generated at a cycle of a carrier period), and does not means a "maximum" and a "minimum" over the overall waveform.

The motor control part 540, as described hereinafter, predicts a time rate of change of the U-phase current Iu based on a voltage VH across the switching elements Q1 and Q2 (i.e., the output voltage of the inverter 30), an inductance Lu of the U-phase coil and an induced voltage Vu, etc.; predicts the local maximum or the local minimum of the U-phase current Iu based on the predicted time rate of change; and switches the drive mode of the switching elements Q22 and Q24 between the single arm drive mode and the double arm drive mode based on the relationship between 0 and the predicted local maximum or local minimum. A way of the predicting the same is described hereinafter.

In the example illustrated in FIG. 13, during the single arm drive mode in the course of the transition of the U-phase current Iu from the negative region to the positive region, the corresponding next local maximums of the U-phase current Iu (black rectangular marks) are predicted at the respective sampling timing T1, T2 and T3 at black circle marks, and the single arm drive mode is continued when the predicted local maximum of the U-phase current Iu is smaller than 0 (see T1 and T2). On the other hand, when the predicted local maximum of the U-phase current Iu is greater than 0, the drive mode is switched from the single arm drive mode to the double arm drive mode (see T3).

Further, during the double arm drive mode in the course of the transition of the U-phase current Iu from the negative region to the positive region, the corresponding next local minimums of the U-phase current Iu (white rectangular marks) are predicted at the respective sampling timing T4, T5 and T6 at white circle marks, and the double arm drive mode is continued when the predicted local minimum of the U-phase current Iu is smaller than 0 (see T4 and T5). On the other hand, when the predicted local minimum of the U-phase current Iu is greater than 0, the drive mode is switched from the double arm drive mode to the single arm drive mode (see T6).

Figure 14:
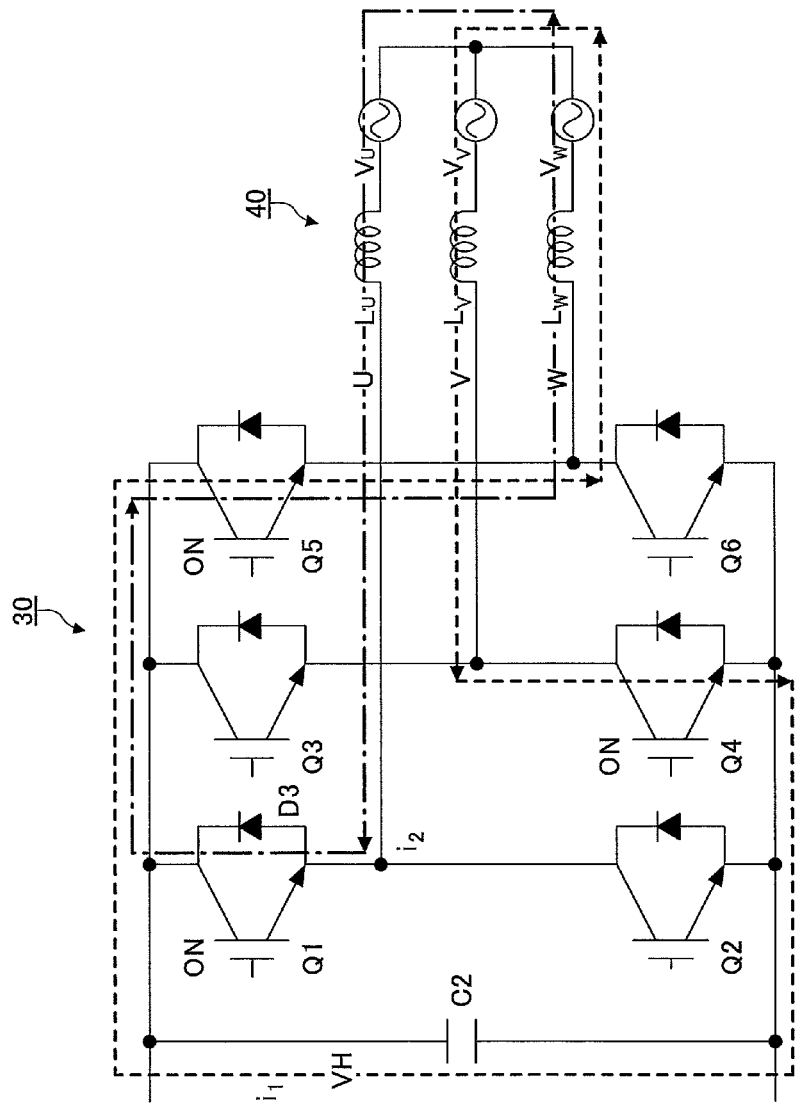
FIG. 14 is a diagram for explaining a way of predicting a time rate of change of the U-phase current Iu.

FIG. 14 is a diagram for explaining the way of predicting the time rate of change of the U-phase current Iu related to FIG. 13. FIG. 14 schematically illustrates a current loop state in the inverter 30 and the vehicle travel motor 40 at a certain single time point. In FIG. 14, the induced voltages Vu, Vv and Vw, which are induced due to a change in a time axis in a rotating magnetic field of the vehicle travel motor 40 are schematically illustrated with symbols of alternating current power supply. In FIG. 14, $i_1$ represents the flow of the current from the positive side of the smoothing capacitor C2 to the negative side of the smoothing capacitor C2 via the switching element Q5, the W-phase coil Lw, the V-phase coil Lv and switching element Q4. Further, $i_2$ represents the flow of the current through the diode D3, the switching element Q5 and the W-phase coil Lw. In this case, the following formula holds true.

$$VH = L_w\left(\frac{di_1}{dt} + \frac{di_2}{dt}\right) + L_V \frac{di_1}{dt} + V_W - V_V$$

$$0 = L_W\left(\frac{di_1}{dt} + \frac{di_2}{dt}\right) + L_U \frac{di_2}{dt} + V_W - V_U$$

According to the formula 1, the time rate of change (dU/dt) in the current $i_u$ flowing through the U-phase coil $L_u$ is as follows.

$$\frac{di_U}{dt} = -\left\{VH + \frac{L_V + L_W}{L_W}(-V_U + V_W) + (V_V - V_W)\right\} / \left\{L_W - \frac{(L_V + L_W)(L_U + L_W)}{L_W}\right\}$$ [formula 2]

Here, the detection value of the voltage sensor for detecting the voltage VH may be used as the input voltage of the inverter 30 (i.e., the output voltage of the DC-DC converter 20). It is noted that the voltage VH is a control parameter (see the voltage control part 508 in FIG. 2) used for the control of the DC-DC converter 20 and the inverter 30 and sensed in general. However, as the value of the voltage VH used to calculate the time rate of change (dU/dt), a control target value for the voltage VH is used (see the motor target voltage VH* in FIG. 2).

The induced voltages Vu, Vv and Vw are parameters that are proportional to an rpm of the vehicle travel motor 40. Thus, the induced voltages Vu, Vv and Vw may be calculated based on a detection value (a signal from a resolver, for example) of the rpm of the vehicle travel motor 40. For example, a relationship between the induced voltages Vu, Vv and Vw and the rpm of the vehicle travel motor 40 may be defined by mapped data in advance. In this case, the induced voltages Vu, Vv and Vw may be calculated according to the detection value of the rpm of the vehicle travel motor 40. Alternatively, in general, the amplitude of the ripple component becomes smaller as the rpm of the vehicle travel motor 40 becomes higher. Thus, the induced voltages Vu, Vv and Vw at the maximum of the ripple component when the rpm of the vehicle travel motor 40 is 0 may be used as a fixed value. Alternatively, the induced voltages Vu, Vv and Vw may be measured (detected).

Inductances Lu, Lv and Lw of the respective coils vary according to a superimposed DC current value; however, the respective values of the induced voltages Vu, Vv and Vw at the time of the DC current being 0 may be used as fixed values, because the prediction is performed around the zero crossing timing. The inductances Lu, Lv and Lw may be varied according to a predetermined parameter, as described hereinafter with reference to FIG. 15 through FIG. 17.

The local maximum of the U-phase current Iu may be calculated based on the time rate of change (dU/dt) of the U-phase current Iu predicted as described above, as follows.

Local maximum=*Iu* (black circle mark)+time rate of change (*dU/dt*) of *U*-phase current *Iu*×Δ*T*.

Here, Iu (black circle mark) corresponds to a sampling value of the U-phase current Iu obtained at the sampling timing of the black circle mark (see FIG. 13). ΔT corresponds to a time (i.e., the dt time) from the sampling timing of the black circle mark in question to the timing when the next local maximum of the U-phase current Iu appears, and can be calculated based on the relationship between the carrier signal and the duty at the sampling timing of the black circle mark in question.

The local minimum of the U-phase current Iu may be calculated based on the time rate of change of the U-phase current Iu predicted as described above, as follows.

Local minimum=*Iu* (white circle mark)+time rate of change (*dU/dt*) of *U*-phase current *Iu*×Δ*T*.

Here, Iu (white circle mark) corresponds to a sampling value of the U-phase current Iu obtained at the sampling timing of the white circle mark. ΔT corresponds to a time (i.e., the dt time) from the sampling timing of the white circle mark in question to the timing when the next local minimum of the U-phase current Iu appears, and can be calculated based on the relationship between the carrier signal and the duty at the sampling timing of the white circle mark in question.

It is noted that in the example illustrated in FIG. 13, it is determined by the prediction whether the next local maximum of the U-phase current Iu exceeds 0; however, it may be determined by the prediction whether the next local maximum of the U-phase current Iu exceeds a predetermined threshold "–Th2" that is smaller than 0. The predetermined threshold "–Th2" may be slightly smaller than 0.

Further, in the example illustrated in FIG. 13, one sampling timing is set at every half period of the carrier signal: however, the sampling timing may be increased and the same prediction may be performed at another sampling timing. For example, the sampling timing may be added in synchronization with the ON/OFF timing of the switching elements Q1 and Q2 of the inverter 30. The sampling timing synchronized with the ON/OFF timing of the switching elements Q1 and Q2 of the inverter 30 includes the timing when the level of the carrier signal exceeds the level of the duty, and the timing when the level of the carrier signal falls below the level of the duty. In this case, at such a sampling timing, the same prediction for the next local maximum or local minimum may be performed. It is noted that, in the case where the next local maximum is predicted at the timing when a certain local minimum is obtained as well as in the case where the next local minimum is predicted at the timing when a certain local maximum is obtained, the dt time ΔT is substantially the same as a gate ON time of the corresponding switching elements Q1 and Q2.

Further, in the example illustrated in FIG. 13, the prediction process of the time rate of change of the U-phase current Iu (and thus the calculation process of the local maximum/ minimum value of the U-phase current Iu and the zero crossing determination process) may be initiated when the absolute value of the sampling value of the U-phase current Iu becomes less than or equal to a predetermined first threshold Th1 during the single arm drive mode in the course of the transition of the U-phase current Iu from the negative range to the positive range. With this arrangement, the process load can be efficiently suppressed. The predetermined first threshold Th1 may correspond to the half of the maximum value (or a value obtained by adding a margin to the maximum value) of the possible amplitude (ripple amplitude) of the ripple components of the U-phase current Iu, for example. It is noted that the absolute value of the predetermined threshold "–Th2" is smaller than that of the predetermined first threshold Th1. Further, similarly, the prediction process of the time rate of change of the U-phase current Iu may be ended when the switching from the double arm drive mode to the single arm drive mode has been implemented as described above during the double arm drive mode in the course of the transition of the U-phase current Iu from the negative range to the positive range. With this arrangement, the process load can be efficiently suppressed.

Next, ways of calculating the inductances Lu, Lv and Lw that can be used to calculate the time rate of change (dU/dt) of the U-phase current Iu are described with reference to FIG. 15 through FIG. 17.

Figure 15:
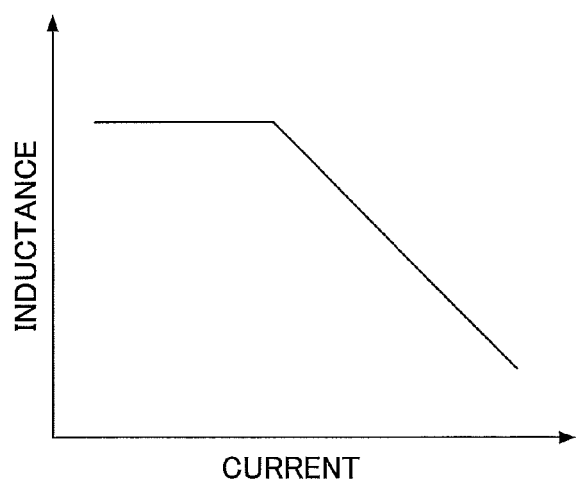
FIG. 15 is a diagram illustrating a relationship between the U-phase current Iu and an inductance Lu of a vehicle travel motor 40.

FIG. 15 is a diagram illustrating a relationship between the U-phase current Iu and the inductance Lu of the vehicle travel motor 40. It is noted that the explanation is made hereinafter with respect to the U-phase of the inverter 30 as an example; however, the same holds true for the V-phase and the W-phase.

The inductance Lu has a constant relationship with respect to the U-phase current Iu, as illustrated in FIG. 15. Thus, mapped data made based on such a relationship may be referred to calculate the inductance Lu according to the detection value of the U-phase current Iu. It is noted that such mapped data may be made based on the relationship between the inductance Lu and the U-phase current Iu that are derived from the experiment, the simulation, etc. It is noted that the sampling value of the U-phase current Iu may be used as the detection value of the U-phase current Iu.

Figure 16:
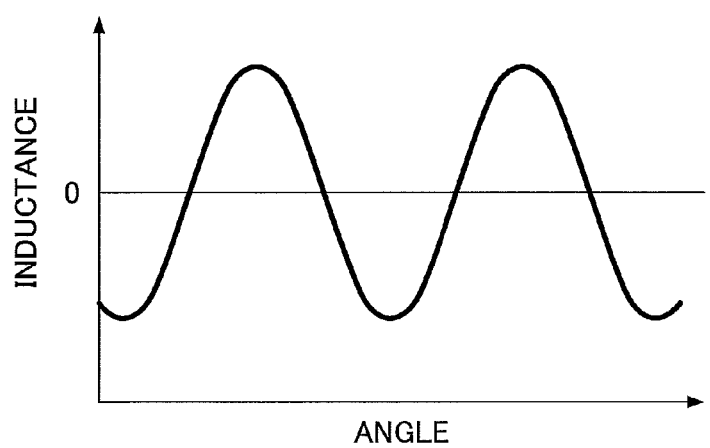
FIG. 16 is a diagram illustrating a relationship between a rotation angle and the inductance Lu of the vehicle travel motor 40.

FIG. 16 is a diagram illustrating a relationship between a rotation angle (electrical angle) and the inductance Lu of the vehicle travel motor 40. It is noted that the explanation is made hereinafter with respect to the U-phase of the inverter 30 as an example; however, the same holds true for the V-phase and the W-phase. However, the respective relationships related to the U-phase, the V-phase and the W-phase are shifted by 120 degrees with respect to each other.

The inductance Lu has a constant relationship with respect to the rotation angle of the vehicle travel motor 40, as illustrated in FIG. 16. Thus, mapped data made based on such a relationship may be referred to calculate the inductance Lu according to the detection value of the rotation angle of the vehicle travel motor 40. It is noted that such mapped data may be made based on the relationship between the inductance Lu and the rotation angle of the vehicle travel motor 40 that are derived from the experiment, the simulation, etc. It is noted that the rotation angle of the vehicle travel motor 40 may be detected by the resolver.

Figure 17:
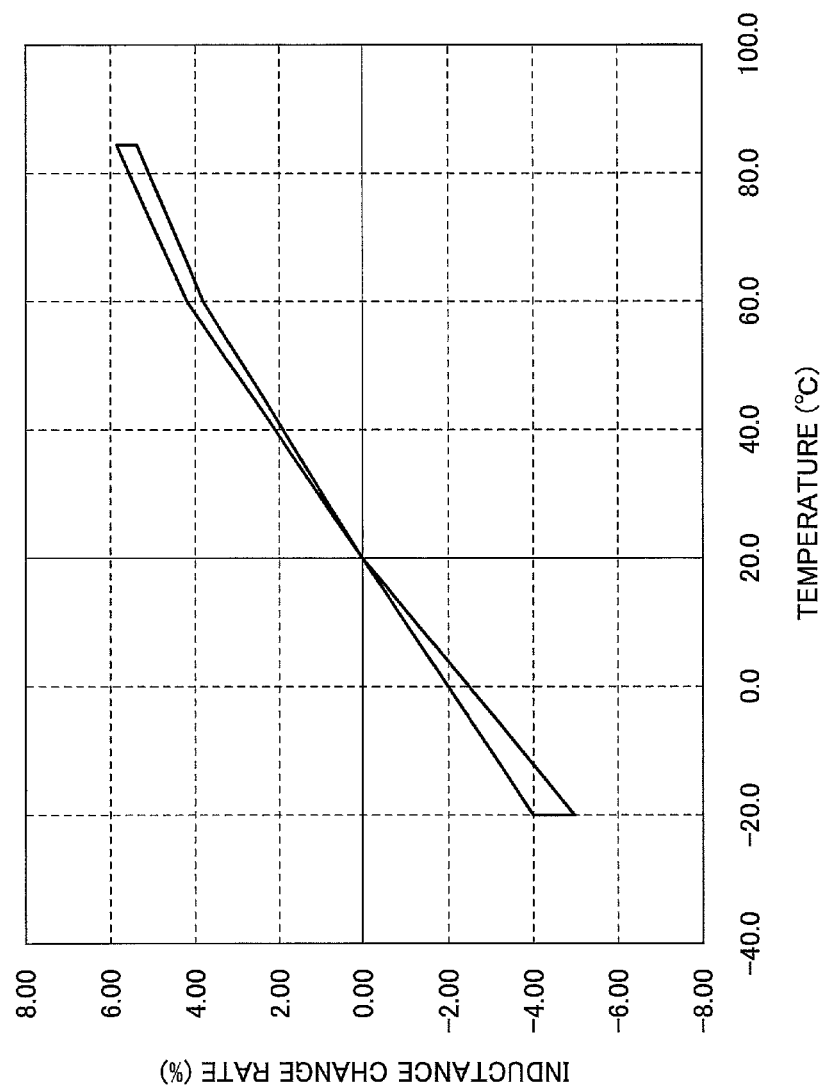
FIG. 17 is a diagram illustrating a relationship between a temperature of the U-phase coil and a rate of a change in the inductance Lu.

FIG. 17 is a diagram illustrating a relationship between a temperature of the U-phase coil and a rate of a change in the inductance Lu. It is noted that the explanation is made hereinafter with respect to the U-phase of the inverter 30 as an example; however, the same holds true for the V-phase and the W-phase. It is noted that, in the example illustrated in FIG. 17, the relationship between the temperature of the U-phase coil and the rate of a change in the inductance Lu has hysteresis.

The change rate of the inductance Lu has a constant relationship with respect to the temperature of the U-phase coil, as illustrated in FIG. 17. Thus, mapped data made based on such a relationship may be referred to calculate the change rate of the inductance Lu according to the detection value of the temperature of the U-phase coil. A detection value of a sensor that detects a temperature of the vehicle travel motor 40 may be used as the detection value of the temperature of the U-phase coil. The calculated change rate of the inductance Lu may be used for a correction. For example, the inductance Lu calculated by the way described above with reference to FIG. 15 or FIG. 16 may be corrected according to the calculated change rate of the inductance Lu. As a result of this, the time rate of change (dU/dt) of the U-phase current Iu is corrected according to the calculated change rate of the inductance Lu. Alternatively, as an equivalent embodiment, the time rate of change (dU/dt) of the U-phase current Iu calculated using the inductance Lu before the correction may be corrected according to the calculated change rate of the inductance Lu. In any case, since the change rate of the inductance Lu according to the change in the temperature of the U-phase coil is considered, the time rate of change (dU/dt) of the U-phase current Iu can be calculated with high accuracy.

It is noted that the ways of calculating the inductances Lu, Lv and Lw described above with reference to FIG. 15 and FIG. 17 may be used as the way of calculating the inductance Lc of the inductor L1 of the DC-DC converter 20 described above.

Further, the inductances Lu, Lv and Lw may be measured instead of the calculation described above. In this case, the inductances Lu, Lv and Lw may be measured with a voltage sensor or an inductance analyzer, for example.

Figure 18:
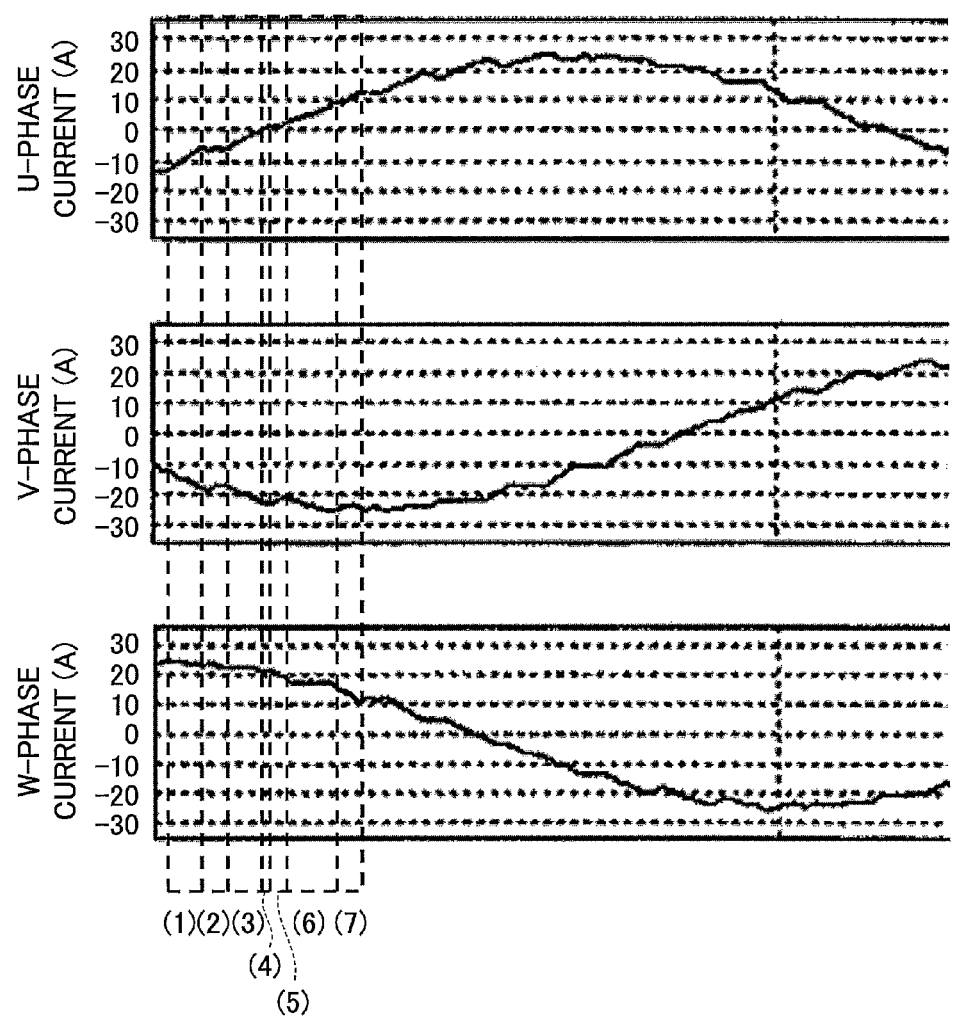
FIG. 18 is a diagram illustrating a relationship between the U-phase current, a V-phase current and a W-phase current in a course of a transition of the U-phase current from a negative range to a positive range.

FIG. 18 is a diagram illustrating a relationship between the U-phase current, the V-phase current and the W-phase current in a course of the transition of the U-phase current from the negative range to the positive range. States of the current loop in regions A1 through A7 and prediction formulas for the corresponding current loop states are explained, as illustrated in FIG. 18. It is noted that FIG. 14 illustrates the current loop state in the region A1 in FIG. 18. The region A1 through region A7 corresponds respective sections between the neighboring local maximum and local minimum of the U-phase current Iu.

FIG. 19 through FIG. 24 illustrate the current loop states in the corresponding regions A1 through A7 in FIG. 18, respectively.

Figure 19:
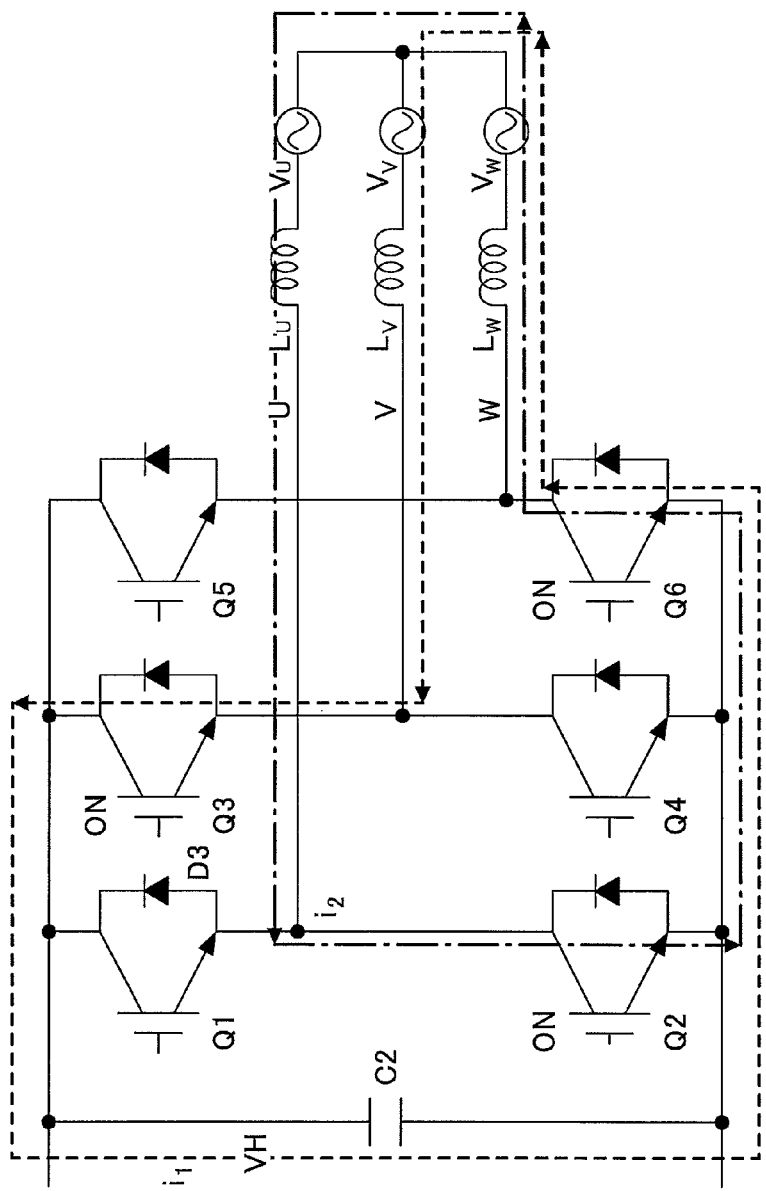
FIG. 19 is a diagram illustrating a state in a region A2 in FIG. 18.

In the region A2 in FIG. 18, the current state illustrated in FIG. 19 is formed. In this region, the time rate of change (dU/dt) in the current $i_u$ flowing through the U-phase coil $L_u$ is as follows.

$$\frac{di_U}{dt} = \left\{VH + \frac{L_V + L_W}{L_W}(V_U - V_W) - (V_V - V_W)\right\} / \left\{L_W - \frac{(L_V + L_W)(L_U + L_W)}{L_W}\right\} \quad \text{[formula 3]}$$

Figure 20:
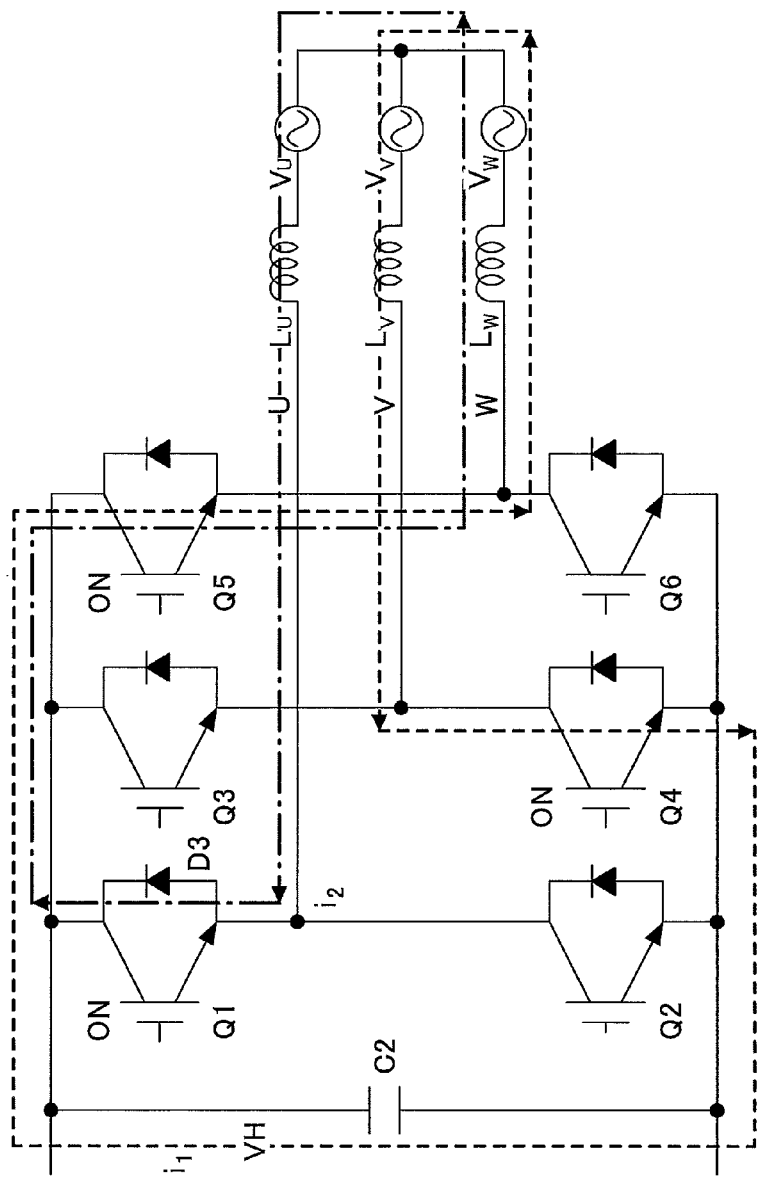
FIG. 20 is a diagram illustrating a state in a region A3 in FIG. 18.

In the region A3 in FIG. 18, the current state illustrated in FIG. 20 is formed. In this region, the same relationship as the formula 1 described above holds true, and the time rate of change (dU/dt) in the current $i_u$ flowing through the U-phase coil $L_u$ is as follows.

$$\frac{di_U}{dt} = -\left\{VH + \frac{L_V + L_W}{L_W}(-V_U + V_W) + (V_V - V_W)\right\} / \left\{L_W - \frac{(L_V + L_W)(L_U + L_W)}{L_W}\right\} \quad \text{[formula 4]}$$

Figure 21:
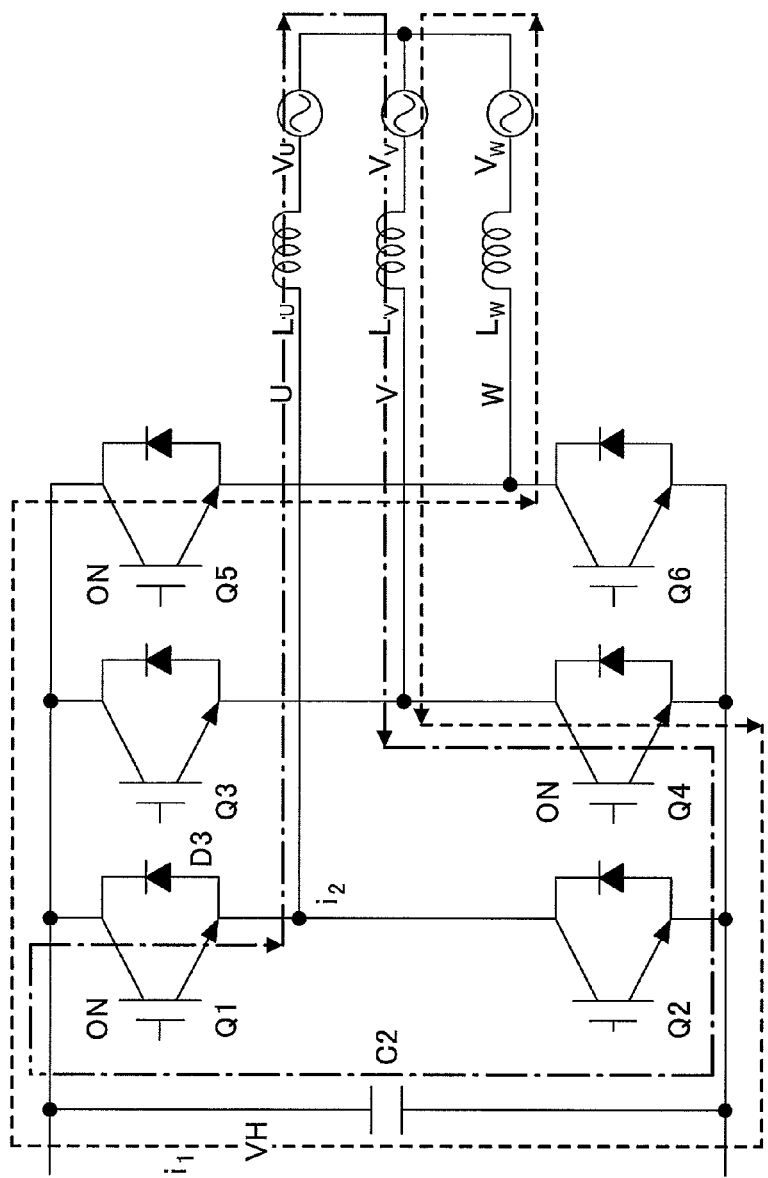
FIG. 21 is a diagram illustrating a state in a region A4 in FIG. 18.

In the region A4 in FIG. 18, the current state illustrated in FIG. 21 is formed. In this region, the time rate of change (dU/dt) in the current $i_u$ flowing through the U-phase coil $L_u$ is as follows.

$$\frac{di_U}{dt} = -\left\{VH - \frac{L_V + L_W}{L_W}(V_U - V_W) + (V_V - V_W)\right\} / \left\{L_W - \frac{(L_V + L_W)(L_U + L_W)}{L_W}\right\} \quad \text{[formula 5]}$$

Figure 22:
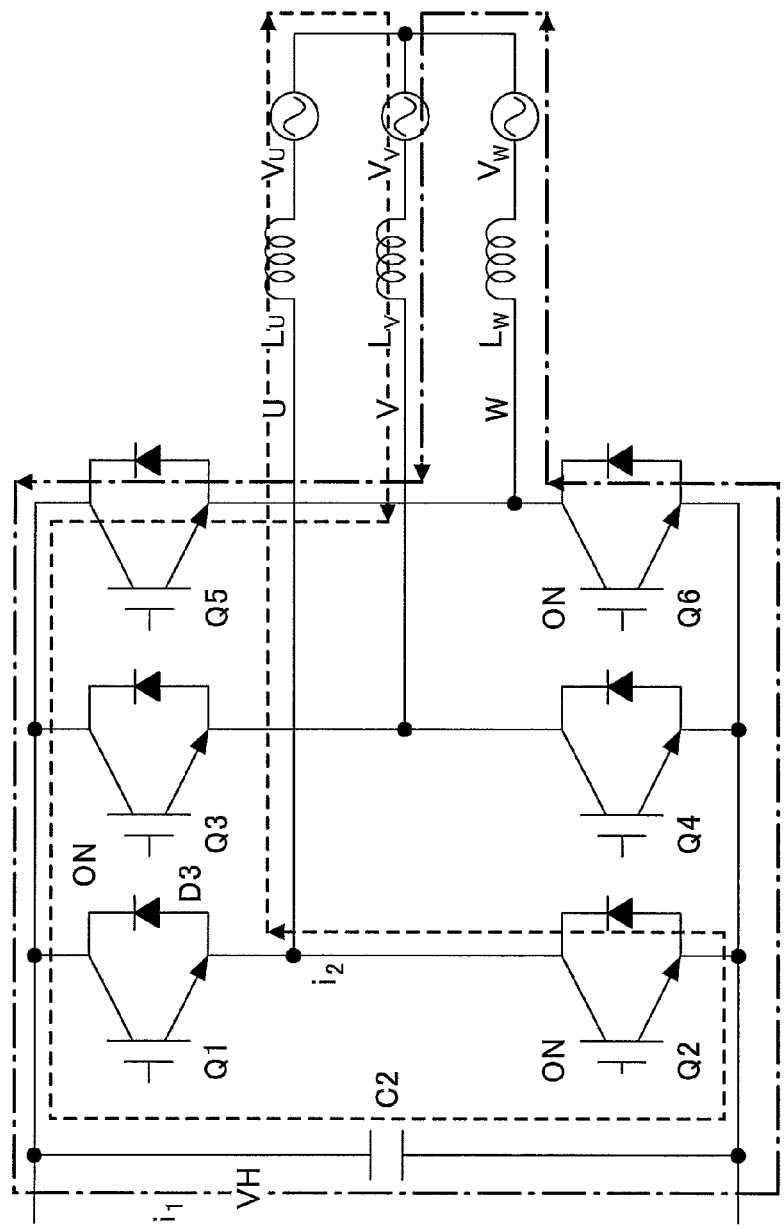
FIG. 22 is a diagram illustrating a state in a region A5 in FIG. 18.

In the region A5 in FIG. 18, the current state illustrated in FIG. 22 is formed. In this region, the time rate of change (dU/dt) in the current $i_u$ flowing through the U-phase coil $L_u$ is as follows.

$$\frac{di_U}{dt} = \left\{ VH + \frac{L_V + L_W}{L_W}(V_U - V_W) - (V_V - V_W) \right\} / \left\{ L_W - \frac{(L_V + L_W)(L_U + L_W)}{L_W} \right\}$$ [formula 6]

Figure 23:
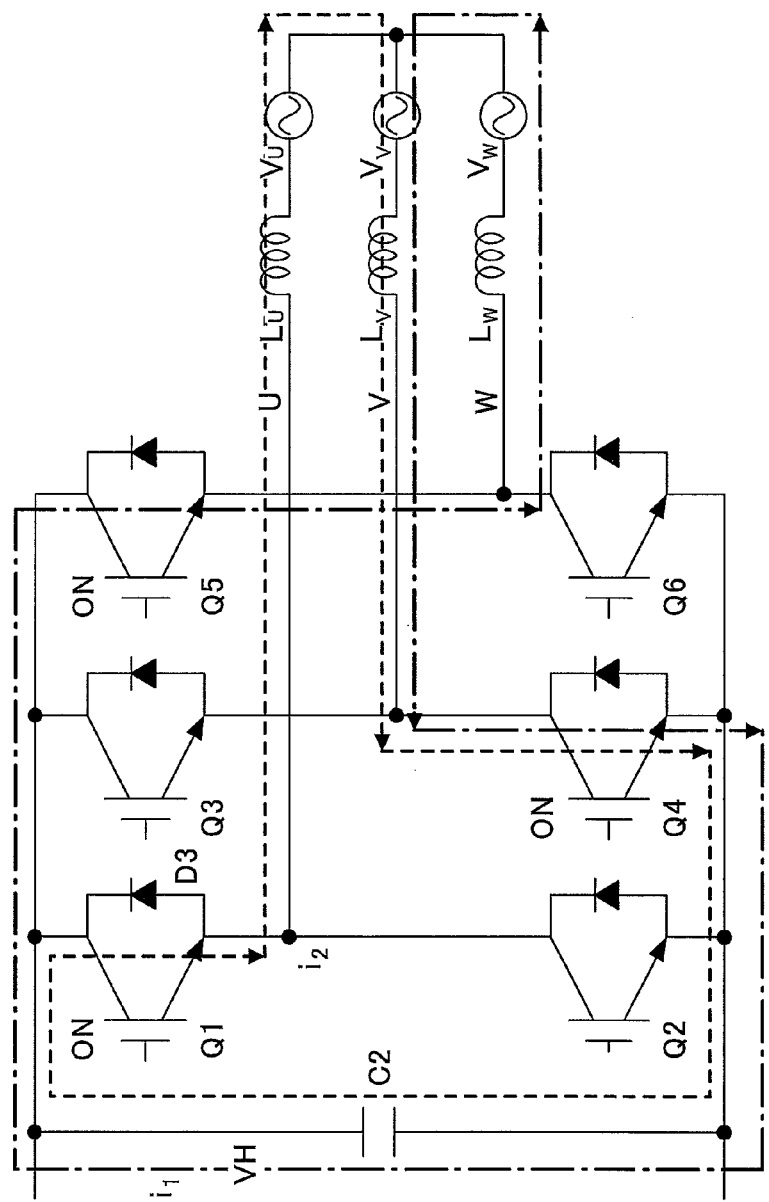
FIG. 23 is a diagram illustrating a state in a region A6 in FIG. 18.

In the region A6 in FIG. 18, the current state illustrated in FIG. 23 is formed. In this region, the time rate of change (dU/dt) in the current $i_u$ flowing through the U-phase coil $L_u$ is as follows.

$$\frac{di_U}{dt} = -\left\{ VH - \frac{L_V + L_W}{L_W}(V_U - V_W) + (V_V - V_W) \right\} / \left\{ L_W - \frac{(L_V + L_W)(L_U + L_W)}{L_W} \right\}$$ [formula 7]

Figure 24:
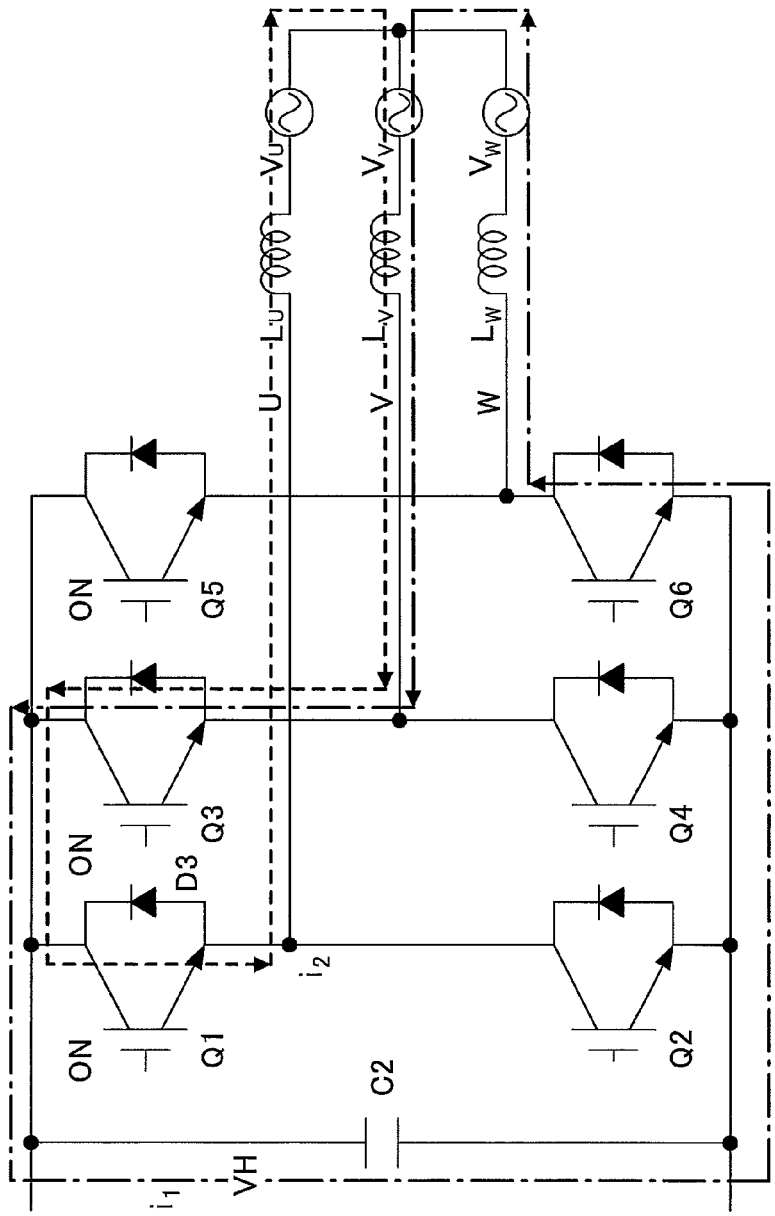
FIG. 24 is a diagram illustrating a state in a region A7 in FIG. 18.

In the region A7 in FIG. 18, the current state illustrated in FIG. 24 is formed. In this region, the time rate of change (dU/dt) in the current $i_u$ flowing through the U-phase coil $L_u$ is as follows.

$$\frac{di_U}{dt} = -\left\{ VH - \frac{L_V + L_W}{L_V}(V_U - V_V) - (V_V - V_W) \right\} / \left\{ L_V - \frac{(L_V + L_W)(L_U + L_V)}{L_V} \right\}$$ [formula 8]

In this way, the calculation formula of the time rate of change (dU/dt) in the current $i_u$ flowing through the U-phase coil $L_u$ may be varied according to the current loop state at the sampling timing of the U-phase current Iu. In this case, the current loop state at the sampling timing of the U-phase current Iu may be determined based on the directions and magnitude of the respective phase currents and the ON/OFF states of the switching elements Q1 through Q6. It is noted that in FIG. 14 and FIGS. 19 through 24, a reference letter "ON" is given to the switching element(s) of the switching elements Q1 through Q6 that is in the ON state. In FIG. 14 and FIGS. 19 through 24, the switching element in the ON state is in the ON state at the time of the double arm drive. In practice, there is a case where the single arm drive is performed. At the time of the single arm drive, some of the switching elements in the ON state in FIG. 14 and FIGS. 19 through 24 are turned off. For example, in the example illustrated in FIG. 14, the switching element Q1 is turned off at the time of the single arm drive. It is noted that the calculation formulas of the time rate of change (dU/dt) at the time of the single arm drive are the same as those at the time of the double arm drive.

Figure 25:
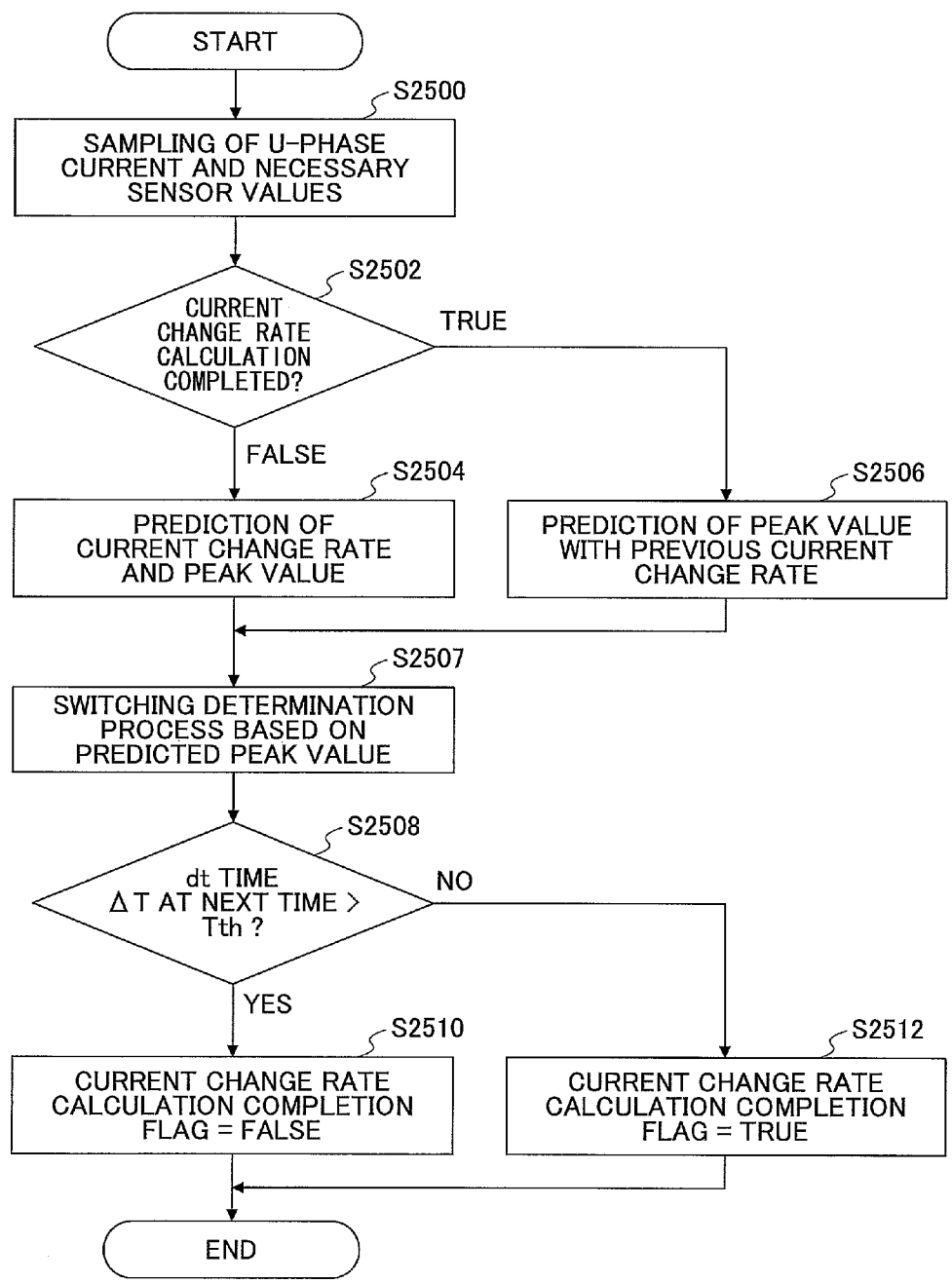
FIG. 25 is a flowchart of an example of a process of predicting a time rate of change (dU/dt) of the U-phase current Iu.

FIG. 25 is a flowchart of an example of a process of predicting the time rate of change (dU/dt) of the U-phase current Iu. The process is performed by the motor control part 540. It is noted that the process illustrated in FIG. 25 may be initiated when the absolute value of the sampling value of the U-phase current Iu becomes less than or equal to the predetermined first threshold Th1, and is executed repeatedly at every sampling timing until the drive mode is returned to the single arm drive.

In step S2500, the U-phase current Iu, and sensor values required to predict the time rate of change (dU/dt) of the U-phase current Iu are sampled at the sampling timing. Specifically, the sampling value of the U-phase current Iu, and the sensor values required to predict the time rate of change (dU/dt) of the U-phase current Iu are obtained. The sensor values required to predict the time rate of change (dU/dt) of the U-phase current Iu include the value of the voltage VH, for example, though they depend on the prediction way described above. It is noted that as an example it is assumed that the sampling timing is set at the crest of the carrier signal (i.e., the peak on the upper side) and the trough of the carrier signal (i.e., the peak on the lower side).

In step S2502, it is determined whether a current change rate calculation completion flag is "False" or "True". The current change rate calculation completion flag is set to "True" if the time rate of change has already been calculated. If it is determined that the current change rate calculation completion flag is "False", the process routine goes to step S2504. On the other hand, if it is determined that the current change rate calculation completion flag is "True", the process routine goes to step S2506.

In step S2504, the time rate of change (dU/dt) of the U-phase current Iu is predicted based on the sensor values obtained in step S2500, and then the next peak value (local maximum or minimum) of the U-phase current Iu is predicted based on the predicted time rate of change (dU/dt) and the sampling value of the U-phase current Iu obtained in step S2500. The way of the predicting the time rate of change (dU/dt) of the U-phase current Iu is as described above. When the next peak value (local maximum or minimum) of the U-phase current Iu is predicted, the process routine goes to step S2507.

In step S2506, the next peak value (local maximum or minimum) of the U-phase current Iu is predicted based on the time rate of change (dU/dt) predicted in the previous or earlier cycle and the sampling value of the U-phase current Iu obtained in step S2500 without using the sensor values obtained in step S2500. The time rate of change (dU/dt) predicted in the previous or earlier cycle may be the time rate of change (dU/dt) calculated at the time of predicting the latest local maximum, if the next peak value of the U-phase current Iu is the local maximum. Similarly, the time rate of change (dU/dt) predicted in the previous or earlier cycle may be the time rate of change (dU/dt) calculated at the time of predicting the latest local minimum, if the next peak value of the U-phase current Iu is the local minimum. Alternatively, the time rate of change (dU/dt) predicted in the previous or earlier cycle may be an average of the time rates of change (dU/dt) calculated at the time of predicting the latest local maximums, if the next peak value of the U-phase current Iu is the local maximum. Similarly, the time rate of change (dU/dt) predicted in the previous or earlier cycle may be an average of the time rates of change (dU/dt) calculated at the time of predicting the latest local minimums, if the next peak value of the U-phase current Iu is the local minimum. Alternatively, the time rate of change (dU/dt) predicted in the previous or earlier cycle may be a value that reverses in sign with respect to the time rate of change (dU/dt) calculated at the time of predicting the latest local minimum, if the next peak value of the U-phase current Iu is the local maximum. Similarly, the time rate of change (dU/dt) predicted in the previous or earlier cycle may be a value that reverses in sign with respect to the time rate of change (dU/dt) calculated at the time of predicting the latest local maximum, if the next peak value of the U-phase current Iu is the local minimum. According to such a process, it becomes possible to eliminate the process time required to calculate the time rate of change (dU/dt) and thus suppress the process load. Thus, the process of step S2506 can be completed shorter than the process of step S2504. When the next peak value (local maximum or minimum) of the U-phase current Iu is predicted, the process routine goes to step S2507.

In step S2507, it is determined based on the peak value (local maximum or minimum) whether the switching from the single arm drive mode to the double arm drive mode or from the double arm drive mode to the single arm drive mode is necessary. The way of determining the same may be as described above with reference to FIG. 13.

In step S2508, it is determined whether the dt time ΔT at the next time is greater than a predetermined time Tth. The dt time ΔT at the next time may be calculated based on the relationship between the carrier signal and the duty at the next time. The predetermined time Tth may correspond to a time (referred to as "a current prediction calculation time", hereinafter) required for the processes of step S2504 and step S2507 described above. If the dt time ΔT at the next time is greater than the process time Tth, the process routine goes to step S2510. On the other hand, if the dt time ΔT at the next time is less than or equal to the process time Tth, the process routine goes to step S2512.

In step S2510, the current change rate calculation completion flag is set to "False". In this case, the prediction is performed by the process of step S2504 at the next sampling cycle.

In step S2510, the current change rate calculation completion flag is set to "True". In this case, the prediction is performed by the process of step S2506 at the next sampling cycle.

FIG. 26 is a diagram for the explanation of FIG. 25 and illustrates an example of a relationship between the sampling timing and timings (i.e., the ON/OFF switching timing of the switching elements Q1 and Q2) of the local maximum or the local minimum (referred to as "a peak value", hereinafter) of the U-phase current Iu. In FIG. 26, star marks indicate the local maximum or the local minimum (peak value) of the U-phase current Iu, that is to say, the value to be predicted. "dt1" through "dt7" represent a time (i.e., the dt time ΔT) from the respective sampling timing T1 through T7 to the next peak generation timing. The "dt1" through "dt7" are determined based on the relationship between the carrier signal and the duty. When the duty changes, the dt time ΔT ("dt1" through "dt7") changes correspondingly, as illustrated in FIG. 16. Specifically, with respect to the section of the carrier signal from the trough to the crest, the dt time ΔT becomes greater as the duty becomes greater, while with respect to the section of the carrier signal from the crest to the trough, the dt time ΔT becomes greater as the duty becomes smaller.

If the dt time ΔT is short, there is a probability that the process of step S2507 in FIG. 25 cannot be completed until the next peak generation timing. If the process of step S2507 in FIG. 25 cannot be completed until the next peak generation timing, there is a probability that the switching between the single arm drive mode and the double arm drive mode cannot be implemented at desired timing. For example, even if it is determined, based on the predicted peak value, that the switching from the single arm drive mode to the double arm drive mode is necessary after the peak generation timing of the peak in question, there may be a problem that the switching from the single arm drive mode to the double arm drive mode is delayed.

In contrast, according to the process illustrated in FIG. 25, when the dt time ΔT is less than or equal to the predetermined time Tth, the next peak value (the local maximum or the local minimum) of the U-phase current Iu is predicted using the time rate of change (dU/dt) calculated in the previous or earlier cycle, instead of the time rate of change (dU/dt) being performed, which enables reducing the time of the prediction process. Thus, even If the dt time ΔT is less than or equal to the predetermined time Tth, it becomes possible to complete the process of step S2507 in FIG. 25 until the next peak generation timing. With this arrangement, the necessary switching between the single arm drive mode and the double arm drive mode can be implemented at appropriate timing.

It is noted that the process illustrated in FIG. 25 is performed twice per a single carrier period at every sampling timing, it may be performed once per a single carrier period, depending on the type of the peak value (the local maximum or the local minimum). For example, in the example illustrated in FIG. 26, during the single arm drive mode in the course of the transition of the U-phase current Iu from the negative region to the positive region, the process illustrated in FIG. 25 may be performed only at the timing when the ripple component increases, such as the sampling timing T1 and T3. Further, during the double arm drive mode in the course of the transition of the U-phase current Iu from the negative region to the positive region (i.e., after the switching from the single arm drive mode to the double arm drive mode), the process illustrated in FIG. 25 may be performed only at the timing when the ripple component decreases, such as the sampling timing T4 and T6.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiments described above, the sampling timing of the U-phase current Iu and the sampling timing of the sensor values required to predict the time rate of change (dU/dt) of the U-phase current Iu are the same; however, there may a difference therebetween.

Further, in the embodiments described above, there may be a case where the switching from the single arm drive mode to the double arm drive mode, and the switching from the double arm drive mode to the single arm drive mode are performed in synchronization with the sampling timing; however, other manners may be implemented. For example, the switching from the single arm drive mode to the double arm drive mode, and the switching from the double arm drive mode to the single arm drive mode may be performed at any timing including the ON/OFF timing of the switching elements Q22 and Q24 (i.e., the timing when the level of the carrier signal exceeds the level of the duty, and the timing when the level of the carrier signal falls below the level of the duty). For example, the switching from the single arm drive mode to the double arm drive mode, and the switching from the double arm drive mode to the single arm drive mode may be performed only at the next ON/OFF timing of the switching elements Q22 and Q24. In this case, the predetermined second threshold Th2 ("−Th2") may be used so that the switching from the single arm drive mode to the double arm drive mode is implemented before the zero crossing event with reliability. For example, in the example illustrated in FIG. 6, it is assumed that it is ideal to perform the switching from the single arm drive mode to the double arm drive mode at the sampling timing T3, and it is necessary to complete the determination to perform the switching before the sampling timing T3. In such a case, if it is determined at the sampling timing T2 that the next local maximum exceeds the predetermined second threshold "−Th2", the switching from the single arm drive mode to the double arm drive mode may be performed at the subsequent ON/OFF timing P1 or P2 of the switching elements Q22 and Q24. Alternatively, if it is determined at the sampling timing T3 that the next local maximum exceeds 0, the switching from the single arm drive mode to the double arm drive mode may be performed at the next switchable timing P3, because the switching cannot be perform at that timing T3. In this case, the switching is implemented after the zero crossing event; however, it is possible to minimize the single arm drive mode state after the zero crossing event.

Further, according to the embodiment described above, the DC/DC converter 20 and the inverter 30, which are examples of the power conversion apparatus, are used for the vehicle; however, the DC/DC converter 20 and the inverter 30 may be used for another application (a power supply apparatus for another motor-operated apparatus, for example). Further, the DC/DC converter 20 and the inverter 30 may be used for another application in the vehicle (for an electric power steering, for example).

The present application is based on Japanese Priority Application No. 2013-29468, filed on Feb. 18, 2013, the entire contents of which are hereby incorporated by reference.

The invention claimed is:

1. A power conversion apparatus, comprising:
a converter having a pair of switching elements that are connected in series between a higher potential side terminal and a lower potential side terminal to form upper and lower arms;
a coil whose end is connected between the pair of switching elements; and
a controller that: i) calculates, based on a voltage between the higher potential side terminal and the lower potential side terminal and an inductance of the coil, a time rate of change of a current value of a current flowing through the coil; ii) predicts, based on the time rate of change, a local minimum or minimum of the current flowing through the coil before an occurrence of the local minimum or minimum; and iii) switches, based on the predicted local minimum or minimum, between a single arm drive mode in which only one of the pair of switching elements is driven to be turned on/off and a double arm drive mode in which the pair of switching elements are driven to be turned on/off in opposite phase.

2. The power conversion apparatus of claim 1, wherein the voltage between the higher potential side terminal and the lower potential side terminal is detected by a sensor, and the inductance of the coil is a specified value or a value derived from mapped data.

3. The power conversion apparatus of claim 1, wherein the controller periodically obtains the current value of the current flowing through the coil at a half cycle of a carrier frequency, and determines, based on the obtained current value of the current flowing through the coil and the time rate of change, whether the switching between the single arm drive mode and the double arm drive mode is necessary, and the controller performs the determination whether the switching between the single arm drive mode and the double arm drive mode is necessary, based on the current value of the current flowing through the coil, which is obtained at a current cycle, and the time rate of change, which is calculated at or before a previous cycle, when a time from a timing of obtaining the current value of the current flowing through the coil to a timing of switching on/off the pair of switching elements is less than or equal to a predetermined time.

4. The power conversion apparatus of claim 1,
the controller calculates the time rate of change of the current value based on the voltage between the higher potential side terminal and the lower potential side terminal, the inductance of the coil, and a voltage of a power supply provided on an input side of the converter.

* * * * *